United States Patent
Lee et al.

(10) Patent No.: US 12,541,285 B2
(45) Date of Patent: Feb. 3, 2026

(54) ELECTRONIC APPARATUS AND METHOD FOR OBTAINING A CAPTURE IMAGE THEREOF

(71) Applicant: SAMSUNG ELECTRONICS CO., LTD., Suwon-si (KR)

(72) Inventors: Eunjin Lee, Suwon-si (KR); Haeree Na, Suwon-si (KR); Jibum Moon, Suwon-si (KR); Haein Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 111 days.

(21) Appl. No.: 18/376,317

(22) Filed: Oct. 3, 2023

(65) Prior Publication Data

US 2024/0160340 A1 May 16, 2024

Related U.S. Application Data

(63) Continuation of application No. PCT/KR2023/011417, filed on Aug. 3, 2023.

(30) Foreign Application Priority Data

Nov. 14, 2022 (KR) .......................... 10-2022-0152006

(51) Int. Cl.
*G06F 3/0484* (2022.01)
*G06F 9/451* (2018.01)

(52) U.S. Cl.
CPC ............ *G06F 3/0484* (2013.01); *G06F 9/451* (2018.02)

(58) Field of Classification Search
CPC ............................... G06F 3/0484; G06F 9/451
See application file for complete search history.

(56) References Cited

U.S. PATENT DOCUMENTS

| | | | |
|---|---|---|---|
| 9,148,618 B2 | 9/2015 | Matas et al. | |
| 9,275,077 B2 | 3/2016 | Lee et al. | |

(Continued)

FOREIGN PATENT DOCUMENTS

| | | |
|---|---|---|
| JP | 2018-110348 A | 7/2018 |
| JP | 2021-39618 A | 3/2021 |

(Continued)

OTHER PUBLICATIONS

"Everything you need to know about iPhone live photos", taken from https://web.archive.org/web/20211027154409/https://www.lifewire.com/iphone-live-photos-1999618, by Sam Costello, published Oct. 27, 2021, 16 pages (Year: 2021).*

(Continued)

*Primary Examiner* — William L Bashore
*Assistant Examiner* — Gregory A Distefano
(74) *Attorney, Agent, or Firm* — Sughrue Mion, PLLC

(57) ABSTRACT

Provided is an electronic apparatus that includes: a display; a communication interface; a memory storing at least one instruction; and at least one processor operatively connected with the display, the communication interface, and the memory. The electronic apparatus is configured to: based on identifying a capture event, obtain a first image that captures a screen of an external apparatus providing a first content, and obtain a second image that captures a screen of the display providing a second content, the external apparatus being communicatively connected, through the communication interface, with the electronic apparatus, obtain a third image comprising the first content and the second content based on the first image and the second image, and store the third image in the memory.

18 Claims, 27 Drawing Sheets

(56) References Cited

U.S. PATENT DOCUMENTS

| | | |
|---|---|---|
| 9,652,659 B2 | 5/2017 | Kang et al. |
| 10,326,892 B2 | 6/2019 | Kawamura et al. |
| 10,382,693 B2 | 8/2019 | Jang et al. |
| 10,628,674 B1* | 4/2020 | Godse .................. G06F 3/0481 |
| 10,776,068 B2 | 9/2020 | Hong et al. |
| 2008/0282160 A1* | 11/2008 | Tonnison ................ G06F 9/451 |
| | | 715/785 |
| 2011/0119610 A1* | 5/2011 | Hackborn ............ G06F 3/0488 |
| | | 715/764 |
| 2012/0092233 A1* | 4/2012 | Kazamaki ............ G06F 16/904 |
| | | 345/1.1 |
| 2012/0221946 A1* | 8/2012 | Dovey .................... G06F 9/451 |
| | | 715/273 |
| 2013/0208127 A1 | 8/2013 | Chou et al. |
| 2013/0225236 A1 | 8/2013 | Lee et al. |
| 2014/0189576 A1* | 7/2014 | Carmi ................. G06V 10/757 |
| | | 715/781 |
| 2016/0050449 A1* | 2/2016 | Cho ................ H04N 21/41265 |
| | | 345/659 |
| 2016/0078059 A1 | 3/2016 | Kang et al. |
| 2017/0060518 A1 | 3/2017 | Hong et al. |
| 2017/0082639 A1* | 3/2017 | Hess ....................... G01N 33/74 |
| 2018/0109732 A1 | 4/2018 | Jang et al. |
| 2018/0191917 A1 | 7/2018 | Kawamura et al. |
| 2018/0285053 A1* | 10/2018 | Fang ......................... G06F 9/44 |
| 2022/0317834 A1* | 10/2022 | Jo .......................... G06F 3/0483 |
| 2023/0418446 A1* | 12/2023 | Peng ..................... G06F 3/0488 |

FOREIGN PATENT DOCUMENTS

| | | |
|---|---|---|
| JP | 7044927 B1 | 3/2022 |
| JP | 2022-177413 A | 12/2022 |
| KR | 10-2013-0087871 A | 8/2013 |
| KR | 10-2014-0003115 A | 1/2014 |
| KR | 10-2014-0009851 A | 1/2014 |
| KR | 10-2015-0080723 A | 7/2015 |
| KR | 10-2016-0032937 A | 3/2016 |
| KR | 10-2018-0043019 A | 4/2018 |
| KR | 10-1885775 B1 | 8/2018 |
| KR | 10-1973641 B1 | 4/2019 |

OTHER PUBLICATIONS

International Search Report and Written Opinion (PCT/ISA/210 and PCT/ISA/237) dated Nov. 20, 2023, issued by International Searching Authority for International Application No. PCT/KR2023/011417.

Communication dated Sep. 30, 2025, issued by the European Patent Office in European Application No. 23891762.9.

* cited by examiner

ELECTRONIC APPARATUS AND METHOD FOR OBTAINING A CAPTURE IMAGE THEREOF

CROSS-REFERENCE TO RELATED APPLICATION(S)

This application is a bypass continuation of International Application No. PCT/KR2023/011417, filed on Aug. 3, 2023, which is based on and claims priority to Korean Patent Application No. 10-2022-0152006, filed on Nov. 14, 2022, in the Korean Intellectual Property Office, the disclosures of which are incorporated by reference herein in their entireties.

BACKGROUND

1. Field

The disclosure relates to an electronic apparatus and a method for obtaining a capture image thereof, and more particularly, to an electronic apparatus configured to obtain a capture image in a state of being communicatively connected to an external apparatus, and a method for obtaining the capture image.

2. Description of the Related Art

Spurred by the development of electronic technologies, services through various types of electronic devices are being developed. In particular, various multi device experience (MDE) services are being suggested that combine artificial intelligence (AI) and the Internet of Things (IoT), etc. to several devices.

SUMMARY

According to an aspect of the disclosure, an electronic apparatus includes: a display; a communication interface; a memory storing at least one instruction; and at least one processor operatively connected with the display, the communication interface, and the memory. The at least one processor is configured to execute the at least one instruction to: based on identifying a capture event, obtain a first image that captures a screen of an external apparatus providing a first content, and obtain a second image that captures a screen of the display providing a second content, the external apparatus being communicatively connected, through the communication interface, with the electronic apparatus, obtain a third image comprising the first content and the second content based on the first image and the second image, and store the third image in the memory.

The capture event may include at least one of an event wherein the screen of the display is captured, an event wherein a predetermined button is manipulated, or an event wherein a predetermined menu is selected, and wherein the at least one processor may be further configured to execute the at least one instruction to: receive the first image from the external apparatus through the communication interface.

The first content may include one of a video content and a user content, the second content may include one of the video content and the user content that is different than the first content, and the user content may include at least one of a chatting content, a writing content, a photographing content, a health content, or an environment content of a user.

The at least one processor may be further configured to execute the at least one instruction to: identify that the second content is related to the first content, based on the first content being provided through at least one of a same application, a same service, a same function, or a same server, as the second content.

The at least one processor may be further configured to execute the at least one instruction to: obtain information on the first content; and identify whether the second content is related to the first content based on the information on the first content.

The at least one processor may be further configured to execute the at least one instruction to: based on identifying the capture event, obtain a fourth image that captures a screen of another external apparatus providing a third content; obtain a fifth image comprising the first content, the second content, and the third content, based on the first image, the second image, and the fourth image; and store the fifth image in the memory.

The at least one processor may be further configured to execute the at least one instruction to: based on obtaining the third image, display the third image in at least a portion of the display; provide, through the display, a list comprising a plurality of third images, the plurality of third images comprising a plurality of first contents and a plurality of second contents, the plurality of first contents being provided on the screen of the external apparatus and the plurality of second contents being provided on the screen of the display, the plurality of first contents and the plurality of second contents corresponding to a time range between a threshold time before and after a time when the capture event is identified; and store a third image selected from among the plurality of third images in the memory.

The at least one processor may be further configured to execute the at least one instruction to: based on obtaining the third image, display the third image in at least a portion of the display; based on the third image being at least one of a live image or a video image, display the third image on an entire area of the display; and based on the third image being selected, provide a replay function by reproducing the third image.

The at least one processor may be further configured to execute the at least one instruction to: based on obtaining the third image, transmit, through the communication interface, the third image to the external apparatus.

The at least one processor may be further configured to execute the at least one instruction to: obtain context information of the external apparatus corresponding to a time when the capture event is identified; map the context information to the third image and store them in the memory; and based on the third image being displayed on the display according to a user instruction, provide the context information on the display together with the third image.

The capture event may include an event wherein the screen of the external apparatus is photographed through a camera, and the at least one processor may be further configured to execute the at least one instruction to: obtain the first image by photographing the screen of the external apparatus.

The at least one processor may be further configured to execute the at least one instruction to: provide information on the second content to the external apparatus; and receive, from the external apparatus, information indicating whether the second content is related to the first content.

According to an aspect of the disclosure a method for obtaining a capture image of an electronic apparatus includes: based on identifying a capture event, obtaining a first image that captures a screen of an external apparatus providing a first content, and obtaining a second image that captures a screen of the display providing a second content, the external apparatus being communicatively connected with the electronic apparatus through a communication interface of the electronic apparatus; obtaining a third image comprising the first content and the second content based on the first image and the second image; and storing the third image.

The capture event may include: at least one of an event wherein the screen of the electronic apparatus is captured, an event wherein a predetermined button is manipulated, or an event wherein a predetermined menu is selected, and the obtaining the first image may include: receiving the first image from the external apparatus.

The first content may include one of a video content and a user content, the second content may include one of the video content and the user content that is different than the first content, and the user content may include at least one of a chatting content, a writing content, a photographing content, a health content, or an environment content of a user.

The obtaining the first image and the second image may include: identifying that the second content is related to the first content based on the first content being provided through at least one of a same application, a same service, a same function, or a same server, as the second content.

The capture event may include an event wherein the screen of the external apparatus is photographed through a camera, and the obtaining the first image may include obtaining the first image by photographing the screen of the external apparatus.

The method may further include: based on identifying the capture event, obtaining a fourth image that captures a screen of another external apparatus providing a third content; obtaining a fifth image comprising the first content, the second content, and the third content, based on the first image, the second image, and the fourth image; and storing the fifth image.

The method may further include: based on obtaining the third image, displaying the third image in at least a portion of the display; providing a list comprising a plurality of third images, the plurality of third images comprising a plurality of first contents and a plurality of second contents, the plurality of first contents being provided on the screen of the external apparatus and the plurality of second contents being provided on the screen of the display, the plurality of first contents and the plurality of second contents corresponding to a time range between a threshold time before and after a time when the capture event is identified; and storing a third image selected from among the plurality of third images.

According to an aspect of the disclosure a non-transitory computer readable medium stores computer readable program code or instructions which are executable by a processor to perform a method for obtaining a capture image of an electronic apparatus. The method includes: based on identifying a capture event, obtaining a first image that captures a screen of an external apparatus providing a first content, and obtaining a second image that captures a screen of the display providing a second content, the external apparatus being communicatively connected with the electronic apparatus through a communication interface of the electronic apparatus; obtaining a third image comprising the first content and the second content based on the first image and the second image; and storing the third image.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
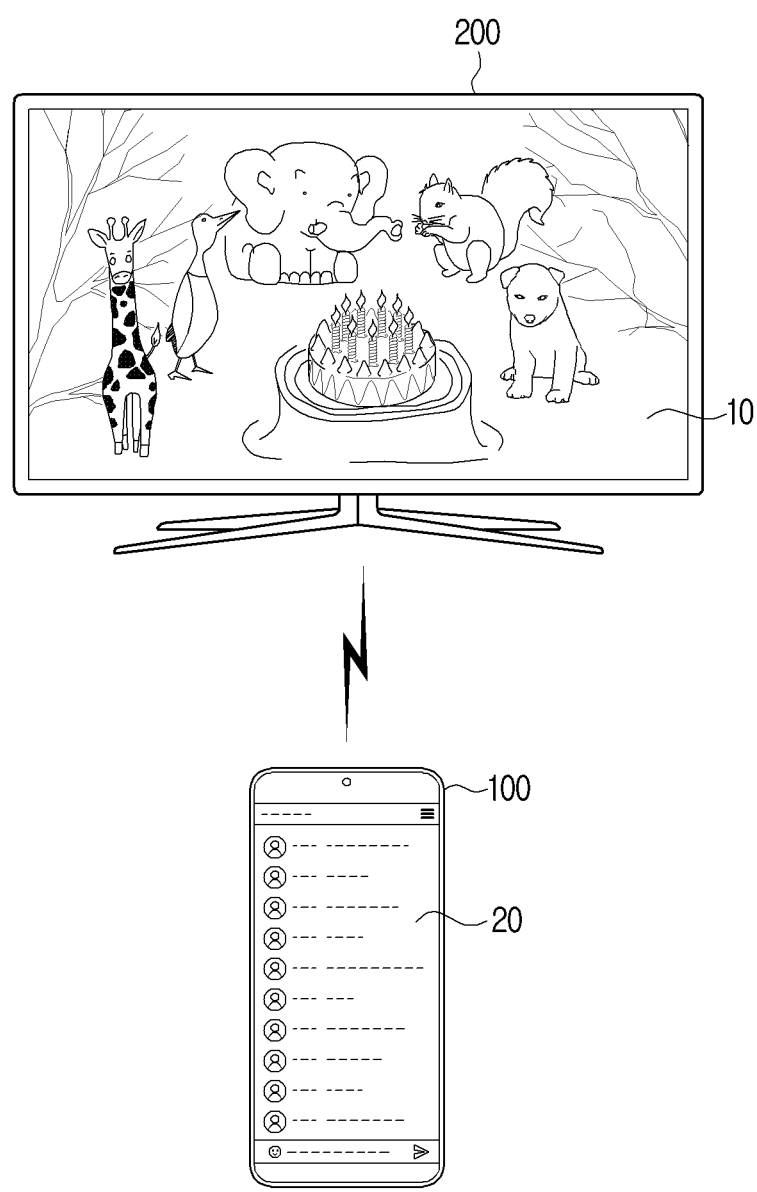
FIG. 1 is a diagram illustrating a multi device experience (MDE) environment according to one or more embodiments.

Hereinafter, example embodiments the disclosure will be described in detail with reference to the accompanying drawings.

First, terms used in this disclosure will be described briefly, and then the disclosure will be described in detail.

As terms used in the embodiments of the disclosure, general terms that are currently used widely were selected as far as possible, in consideration of the functions described in the disclosure. However, the terms may vary depending on the intention of those skilled in the art, previous court decisions, or emergence of new technologies, etc. Also, in particular cases, there may be terms that were arbitrarily designated by the applicant, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

Also, terms such as "first," "second," and the like may be used to describe various elements, but the terms are not intended to limit the elements. Such terms are used only to distinguish one element from another element.

In addition, singular expressions include plural expressions, unless defined obviously differently in the context. Also, in the disclosure, terms such as "include" and "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

Further, the expression "at least one of A or B" should be interpreted to mean only "A," only "B," or both "A" and "B."

Also, in the disclosure, "a module" or "a part" performs at least one function or operation, and may be implemented as hardware or software, or as a combination of hardware and software. Further, a plurality of "modules" or a plurality of "parts" may be integrated into at least one module and implemented as at least one processor, except "a module" or "a part" that needs to be implemented as specific hardware.

Hereinafter, embodiments of the disclosure will be described in detail with reference to the accompanying drawings, where similar reference characters denote corresponding features consistently throughout, such that those having ordinary skill in the art to which the disclosure belongs can easily carry out the disclosure. However, it should be noted that the disclosure may be implemented in various different forms, and is not limited to the embodiments described herein. Also, in the drawings, parts that are not related to explanation were omitted, for explaining the disclosure clearly, and throughout the specification, similar components were designated by similar reference numerals.

FIG. 1 is a diagram illustrating a multi device experience (MDE) environment according to one or more embodiments.

A MDE means a user environment for providing differentiated experiences by combining the Internet of Things (IoT) and/or artificial intelligence (AI), etc. to several devices. For example, various services can be provided by communicatively connecting various types of devices such as a TV, a home appliance, a mobile device, a wearable device, etc.

In an embodiment, a plurality of devices for providing an MDE environment, e.g., a first electronic apparatus 100 and a second electronic apparatus 200 can be implemented as various devices. For example, the first electronic apparatus 100 and the second electronic apparatus 200 can be implemented as electronic apparatuses having a display function such as a TV, a smart monitor, a projector, a smartphone, a tablet PC, a desktop PC, a laptop PC, a PC, a portable multimedia player (PMP), a large format display (LFD), digital signage, a digital information display (DID), a video wall, a navigation, an AI speaker, etc. Also, the electronic apparatus 100 and another electronic apparatus 200 can be implemented as home appliances having a display function such as a refrigerator, an air conditioner, an air purifier, an oven, a washing machine, etc. In addition, the electronic apparatus 100 and the another electronic apparatus 200 can be implemented as a wearable device having a display function such as a smart watch.

The first electronic apparatus 100 and the second electronic apparatus 200 can communicate through various communication methods including not only wireless communication such as Bluetooth communication, Wi-Fi communication, infrared communication, mobile communication, etc., but also wired communication.

In an embodiment, the first electronic apparatus 100 is implemented as a smartphone, and the second electronic apparatus 200 is implemented as a TV, as illustrated in FIG. 1.

For example, there may be a case wherein a specific content, e.g., a video content is provided at the second electronic apparatus 200, and a content related to the video content is provided at the first electronic apparatus 100 communicatively connected with the second electronic apparatus 200. For example, a broadcasting content may be provided at the second electronic apparatus 200, and a real time chatting screen related to the broadcasting content may be provided at the first electronic apparatus 100. In this case, there may be a need of a user to capture the broadcasting content and store it on a specific time point. For example, there may be a need of a user to capture information on a specific prop in the broadcasting content and store it. In this case, if not only the broadcasting content screen of the second electronic apparatus 200 but also the real time chatting screen of the first electronic apparatus 100 are captured together and stored, a differentiated MDE experience can be provided.

Accordingly, hereinafter, various embodiments wherein screens of a plurality of devices are captured together according to a user's capture instruction and stored in case the plurality of devices are used while being communicatively connected will be described.

Figure 2A:
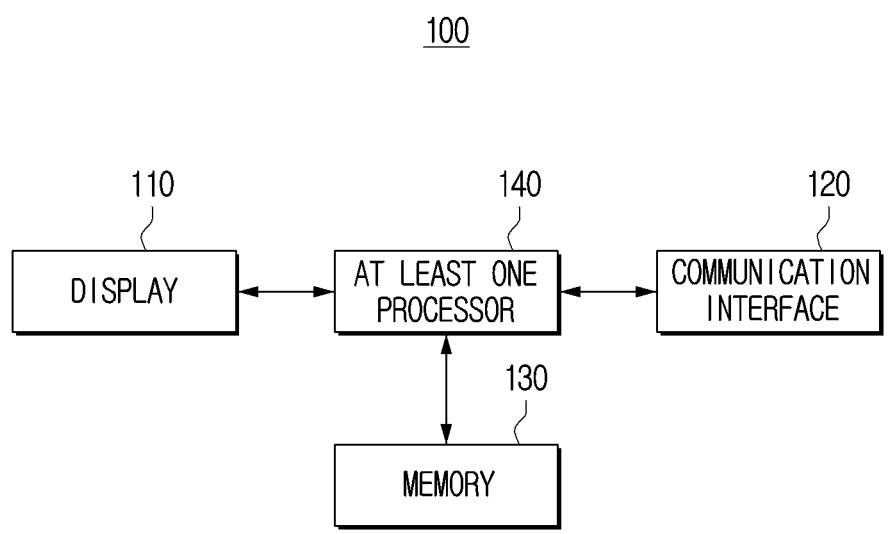
FIG. 2A is a block diagram illustrating a configuration of an electronic apparatus according to one or more embodiments.

FIG. 2A is a block diagram illustrating a configuration of an electronic apparatus according to one or more embodiments.

According to FIG. 2A, the electronic apparatus 100 includes a display 110, a communication interface 120, a memory 130, and at least one processor 140.

The display 110 may be implemented as a display including self-luminescence elements, or a displaying including non-self-luminescence elements and a backlight. For example, the display 110 may be implemented as various forms of displays such as a liquid crystal display (LCD), an organic light-emitting diodes (OLED) display, light emitting diodes (LED), micro LED, mini LED, a plasma display panel (PDP), a quantum dot (QD) display, quantum dot light-emitting diodes (QLED), etc. Inside the display 110, driving circuits that may be implemented in forms such as an a-si TFT, a low temperature poly silicon (LTPS) TFT, an organic TFT (OTFT), etc., a backlight unit, etc. may also be included. According to one or more embodiments, on the front surface of the display 110, a touch sensor that is in a form such as a touch film, a touch sheet, a touch pad, etc., and detects a touch operation may be arranged, and implemented to detect various types of touch inputs. For example, the display 110 may detect various types of touch inputs such as a touch input by a user hand, a touch input by an input device such as a stylus pen, a touch input by a specific electrostatic material, etc. Here, an input device may be implemented as an input device of a pen type that can be referred to as various terms such as an electronic pen, a stylus pen, an S-pen, etc. In an embodiment, the display 110 may be implemented as a flat display, a curved display, a flexible display that can be folded and/or rolled, etc.

The communication interface 120 can obviously be implemented as various interfaces according to implementation examples of the electronic apparatus 100. For example, the communication interface 120 may perform communication with an external apparatus, an external storage medium (e.g., a USB memory), an external server (e.g., a webhard), etc. through communication methods such as Bluetooth, Wi-Fi (Wi-Fi), AP-based Wi-Fi (Wi-Fi, a wireless LAN network), Zigbee, a wired/wireless local area network (LAN), a wide area network (WAN), an Ethernet, the IEEE 1394, a high-definition multimedia interface (HDMI), a universal serial bus (USB), a mobile high-definition link (MHL), the Audio Engineering Society/European Broadcasting Union (AES/EBU), Optical, Coaxial, etc. In an embodiment, the communication interface 120 may perform communication with a user terminal 200 and/or a remote control apparatus 300.

The memory 130 may store data necessary for various embodiments. The memory 130 may be implemented in a form of a memory embedded in the electronic apparatus 100, or in a form of a memory that can be attached to or detached from the electronic apparatus 100, according to the usage of stored data. For example, in the case of data for operating the electronic apparatus 100, the data may be stored in a memory embedded in the electronic apparatus 100, and in the case of data for an extended function of the electronic apparatus 100, the data may be stored in a memory that can be attached to or detached from the electronic apparatus 100. In an embodiment, in the case of a memory embedded in the electronic apparatus 100, the memory may be implemented as at least one of a volatile memory (e.g., a dynamic RAM (DRAM), a static RAM (SRAM), or a synchronous dynamic RAM (SDRAM), etc.) or a non-volatile memory (e.g., a one time programmable ROM (OTPROM), a programmable ROM (PROM), an erasable and programmable ROM (EPROM), an electrically erasable and programmable ROM (EEPROM), a mask ROM, a flash ROM, a flash memory (e.g., NAND flash or NOR flash, etc.), a hard drive, or a solid state drive (SSD)). Also, in the case of a memory that can be attached to or detached from the electronic apparatus 100, the memory may be implemented in forms such as a memory card (e.g., compact flash (CF), secure digital (SD), micro secure digital (Micro-SD), mini secure digital (Mini-SD), extreme digital (xD), a multi-media card (MMC), etc.), an external memory that can be connected to a USB port (e.g., a USB memory), etc.

The at least one processor 140 controls the overall operations of the electronic apparatus 100. Specifically, the at least one processor 140 may be connected with each component of the electronic apparatus 100, and control the overall operations of the electronic apparatus 100. For example, the at least one processor 140 may be electronically connected with the display 110 and the memory 130, and control the overall operations of the electronic apparatus 100. Also, the at least one processor 140 may consist of one or a plurality of processors.

The at least one processor 140 may perform the operations of the electronic apparatus 100 according to the various embodiments by executing at least one instruction stored in the memory 130.

The at least one processor 140 may include one or more of a central processing unit (CPU), a graphics processing unit (GPU), an accelerated processing unit (APU), a many integrated core (MIC), a digital signal processor (DSP), a neural processing unit (NPU), a hardware accelerator, or a machine learning accelerator. The at least one processor 140 may control one or a random combination of other components of the electronic apparatus, and perform operations regarding communication or data processing. The at least one processor 140 may execute one or more programs or instructions stored in the memory. For example, the at least one processor 140 may perform the method according to one or more embodiments of the disclosure by executing the one or more instructions stored in the memory.

In case the method according to one or more embodiments of the disclosure includes a plurality of operations, the plurality of operations may be performed by one processor, or performed by a plurality of processors. For example, when a first operation, a second operation, and a third operation are performed by the method according to one or more embodiments, all of the first operation, the second operation, and the third operation may be performed by a first processor, or the first operation and the second operation may be performed by the first processor (e.g., a generic-purpose processor), and the third operation may be performed by a second processor (e.g., an artificial intelligence-dedicated processor).

The at least one processor 140 may be implemented as a single core processor including one core, or may be implemented as one or more multicore processors including a plurality of cores (e.g., multicores of the same kind or multicores of different kinds). In case the at least one processor 140 is implemented as multicore processors, each of the plurality of cores included in the multicore processors may include an internal memory of the processor such as a cache memory, an on-chip memory, etc., and a common cache shared by the plurality of cores may be included in the multicore processors. Also, each of the plurality of cores (or some of the plurality of cores) included in the multicore processors may independently read a program instruction for implementing the method according to one or more embodiments of the disclosure and perform the instruction, or the plurality of entire cores (or some of the cores) may be linked with one another, and read a program instruction for implementing the method according to one or more embodiments of the disclosure and perform the instruction.

In case the method according to one or more embodiments of the disclosure includes a plurality of operations, the plurality of operations may be performed by one core among the plurality of cores included in the multicore processors, or may be implemented by the plurality of cores. For example, when the first operation, the second operation, and the third operation are performed by the method according to one or more embodiments, all of the first operation, the second operation, and the third operation may be performed by a first core included in the multicore processors, or the first operation and the second operation may be performed by the first core included in the multicore processors, and the third operation may be performed by a second core included in the multicore processors.

In the embodiments of the disclosure, the processor may mean a system on chip (SoC) wherein at least one processor and other electronic components are integrated, a single core processor, a multicore processor, or a core included in the single core processor or the multicore processor. Also, here, the core may be implemented as a CPU, a GPU, an APU, a MIC, a DSP, an NPU, a hardware accelerator, or a machine learning accelerator, etc., but the embodiments of the disclosure are not limited thereto. Hereinafter, the at least one processor 140 will be referred to as the processor 140, for the convenience of explanation.

Figure 2B:
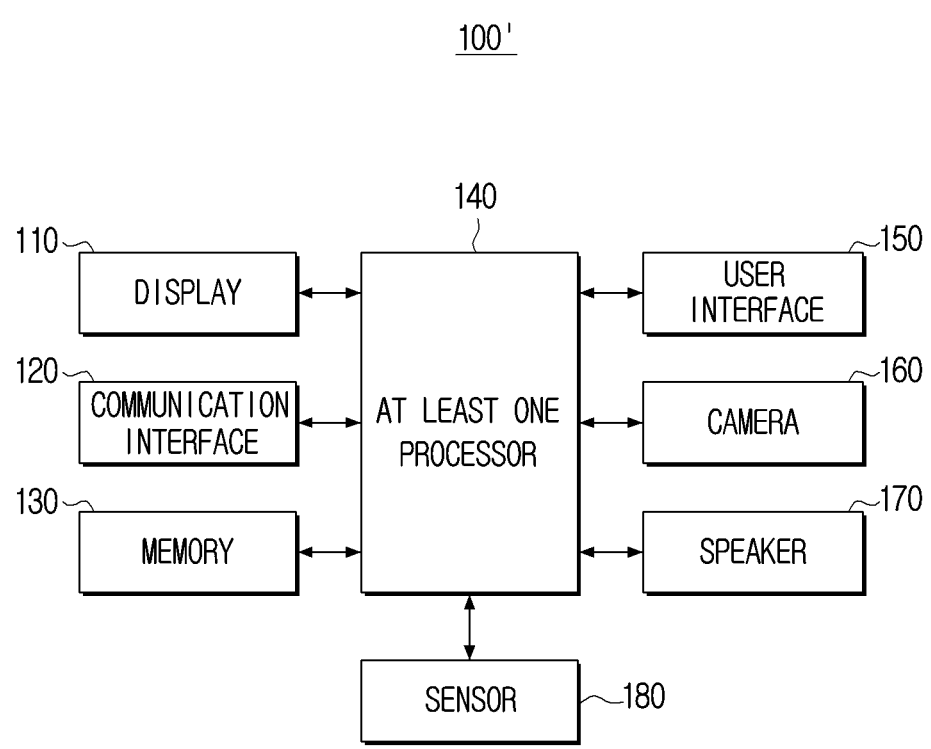
FIG. 2B is a block diagram illustrating in detail a configuration of an electronic apparatus according to one or more embodiments.

FIG. 2B is a block diagram illustrating in detail a configuration of an electronic apparatus according to one or more embodiments.

According to FIG. 2B, an electronic apparatus 100' may include a display 110, a communication interface 120, a memory 130, at least one processor 140, a user interface 150, a camera 160, a speaker 170, and a sensor 180. Among the components illustrated in FIG. 2B, regarding the components overlapped with the components illustrated in FIG. 2A, detailed explanation will be omitted.

The user interface 150 may be implemented as a device such as a button, a touch pad, a mouse, and a keyboard, or may be implemented as a touch screen that can perform the aforementioned display function and a manipulation input function together, etc.

The camera 160 may be turned on according to a predetermined event, and perform photographing. The camera 160 may convert a photographed image into an electronic signal, and generate image data based on the converted signal. For example, a subject may be converted into an electronic image signal through a semiconductor optical element (a charge coupled device (CCD)), and the image signal converted as such may be amplified and converted into a digital signal, and then go through signal processing. For example, the camera 120 may be implemented as a general camera, a stereo camera, a depth camera, etc.

The speaker 170 may be a component that outputs not only various kinds of audio data but also various kinds of notification sounds or voice messages, etc. The processor 140 may control the speaker 170 to output feedbacks or various kinds of notifications according to the various embodiments of the disclosure in audio forms.

The sensor 180 may include various types of sensors such as a touch sensor, a proximity sensor, an acceleration sensor (or a gravity sensor), a geomagnetic sensor, a gyro sensor, a pressure sensor, a location sensor, a distance sensor, an illumination sensor, etc.

Other than the above, the electronic apparatus 100' may include a microphone, a tuner, and a demodulator, etc. depending on implementation examples.

The microphone is a component for receiving input of a user voice or other sounds and converting them into audio data. However, according to a different embodiment, the electronic apparatus 100' may receive a user voice input through an external apparatus through the communication interface 110.

The tuner may receive a radio frequency (RF) broadcasting signal by tuning a channel selected by a user among RF broadcasting signals received through an antenna or all pre-stored channels.

The demodulator may receive a digital IF (DIF) signal converted at the tuner and demodulate the signal, and perform channel demodulation, etc.

Figure 3:
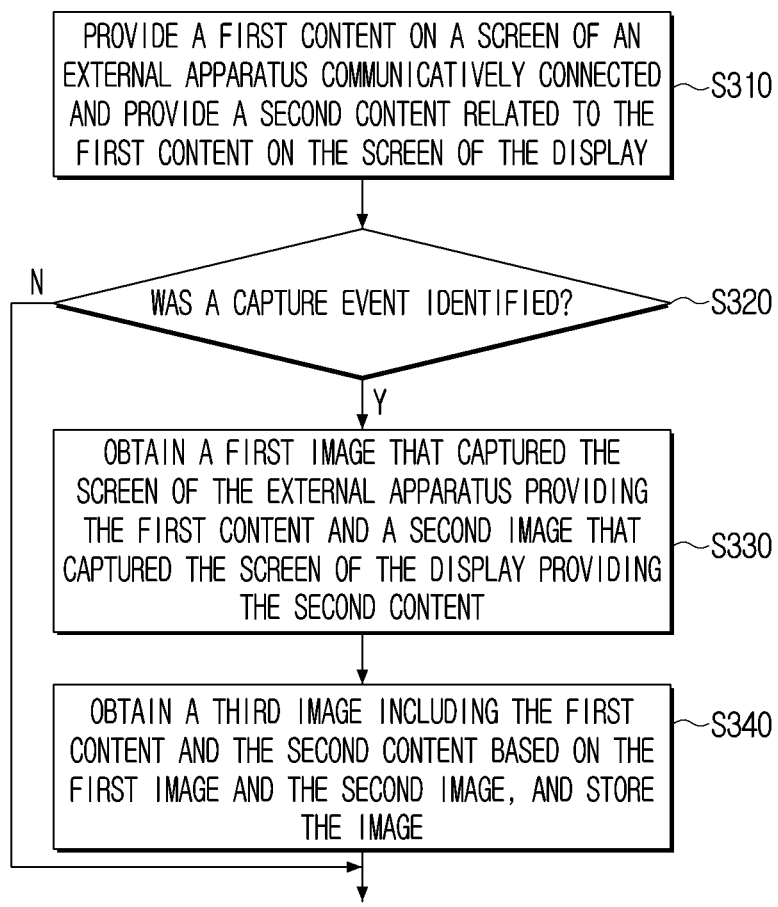
FIG. 3 is a diagram illustrating a method for obtaining a capture image of an electronic apparatus according to one or more embodiments.

FIG. 3 is a diagram for illustrating a method for obtaining a capture image of the electronic apparatus 100 according to one or more embodiments.

As illustrated in FIG. 3, the processor 140 may provide a first content on the screen of the external apparatus 200 communicatively connected through the communication interface 120, and provide a second content related to the first content on the screen of the display 110 in operation S310.

If a capture event is identified in operation S320:YES while the operation in the operation S310 is maintained, the processor 140 may obtain a first image that captured the screen of the external apparatus 200 providing the first content, and a second image that captured the screen of the display 110 providing the second content in operation S330. Here, the capture event may include at least one of an event wherein the screen of the external apparatus 200 is photographed through the camera 160 provided on the electronic apparatus 100, an event wherein the screen of the display 110 is captured, an event wherein a predetermined button is manipulated, an event wherein a predetermined menu is selected, or an event wherein a predetermined condition is satisfied in the electronic apparatus 100 or the external apparatus 200.

Here, screen capture may include not only an operation of simply capturing a displayed image, but also an operation of storing information provided on the screen or information connected (or related) to the current screen. For example, screen capture may include an operation of storing information on a file in case a specific file is being provided on the current screen, an operation of storing information on an application that is currently being executed, an operation of storing context information of the current device, etc. Various embodiments in this regard will be described later with reference to the drawings.

Then, the processor 140 may obtain a third image including the first content and the second content based on the first image and the second image, and store the image in the memory 130 in operation S340. Alternatively, the processor 140 may transmit the third image to the external apparatus 200 through the communication interface 120.

In this case, the first image may be obtained by the electronic apparatus 100, or received from the external apparatus 200, according to the type of the capture event.

As an example, in case a capture event is an event wherein the screen of the external apparatus 200 is photographed through the camera 160, the electronic apparatus 100 may obtain the first image, and detailed explanation in this regard will be described based on FIG. 4.

As another example, in case a capture event is an event wherein the screen of the display 110 is captured, the first image may be received from the external apparatus 200. For example, if an event wherein the screen of the display 110 is captured is identified, the processor 140 may transmit a control signal for screen capture to the external apparatus 200, and receive the first image that captured the screen of the external apparatus 200 from the external apparatus 200.

As still another example, in case a capture event is at least one of an event wherein a predetermined button is manipulated or an event wherein a predetermined menu is selected, the first image may be received from the external apparatus 200. For example, if an event wherein a predetermined button is manipulated or an event wherein a predetermined menu is selected is identified, the processor 140 may transmit a control signal for screen capture to the external apparatus 200, and receive the first image that captured the screen of the external apparatus 200 from the external apparatus 200.

Figure 4:
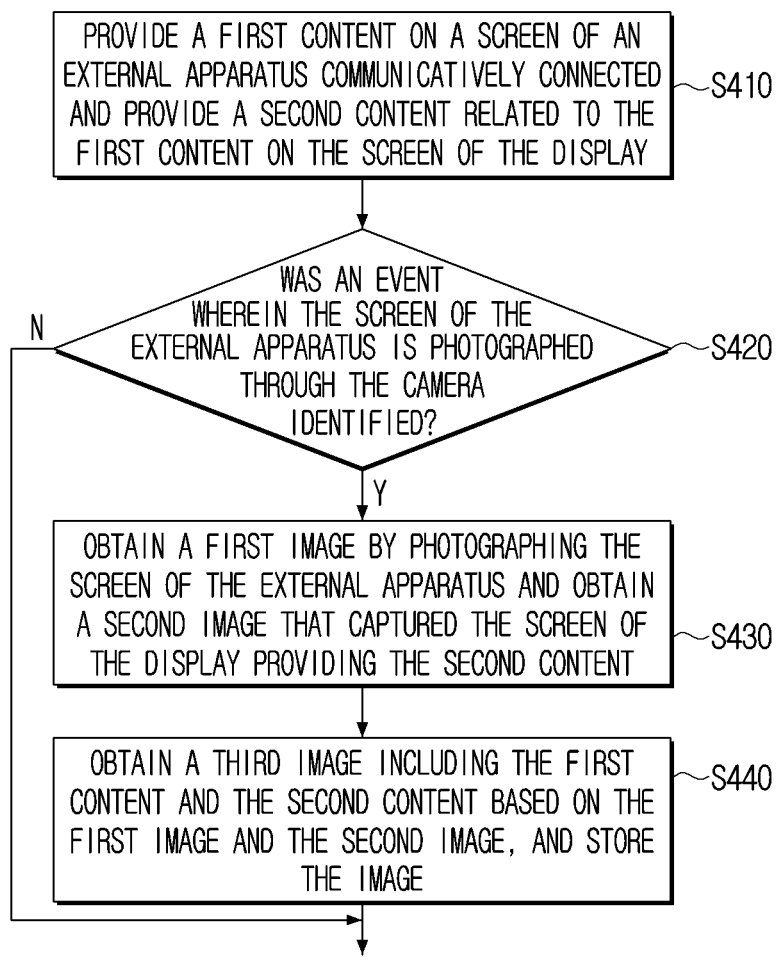
FIG. 4 is a diagram illustrating a method for obtaining a capture image of an electronic apparatus according to one or more embodiments.

FIG. 4 is a diagram for illustrating a method for obtaining a capture image of the electronic apparatus 100 according to one or more embodiments.

As illustrated in FIG. 4, the processor 140 may provide a first content on the screen of the external apparatus 200 communicatively connected through the communication interface 120, and provide a second content related to the first content on the screen of the display 110 in operation S410.

If a capture event wherein the screen of the external apparatus 200 is photographed through the camera 160 is identified in operation S420:YES while the operation in the operation S410 is maintained, the processor 140 may obtain a first image by photographing the screen of the external apparatus 200 and obtain a second image that captured the screen of the display 110 providing the second content in operation S430. That is, the processor 140 may capture the screen of the display 110 while photographing the screen of the external apparatus 200 by using the camera 160 according to a photographing event.

Then, the processor 140 may obtain a third image including the first content and the second content based on the first image and the second image, and store the image in the memory 130 in operation S440.

In an embodiment, any one of the first content or the second content may be a video content, and the other one of the first content or the second content may be a user content related to the video content. In an embodiment, a video content may also be implemented as a still image content (e.g., an image of an artwork, an NFT image, a thumbnail image, etc.). Here, a user content may be a content related to a user's context such as a user's interaction, a user's action, a user's environment, etc. For example, a user content may include at least one of a chatting content, a writing content, a photographing content, a health content, or an environment content of a user.

For example, the first content provided through the external apparatus 200 may be a video content, and the second content provided through the electronic apparatus 100 may be a user content. Alternatively, the first content provided through the external apparatus 200 may be a user content, and the second content provided through the electronic apparatus 100 may be a video content.

Figure 5A:
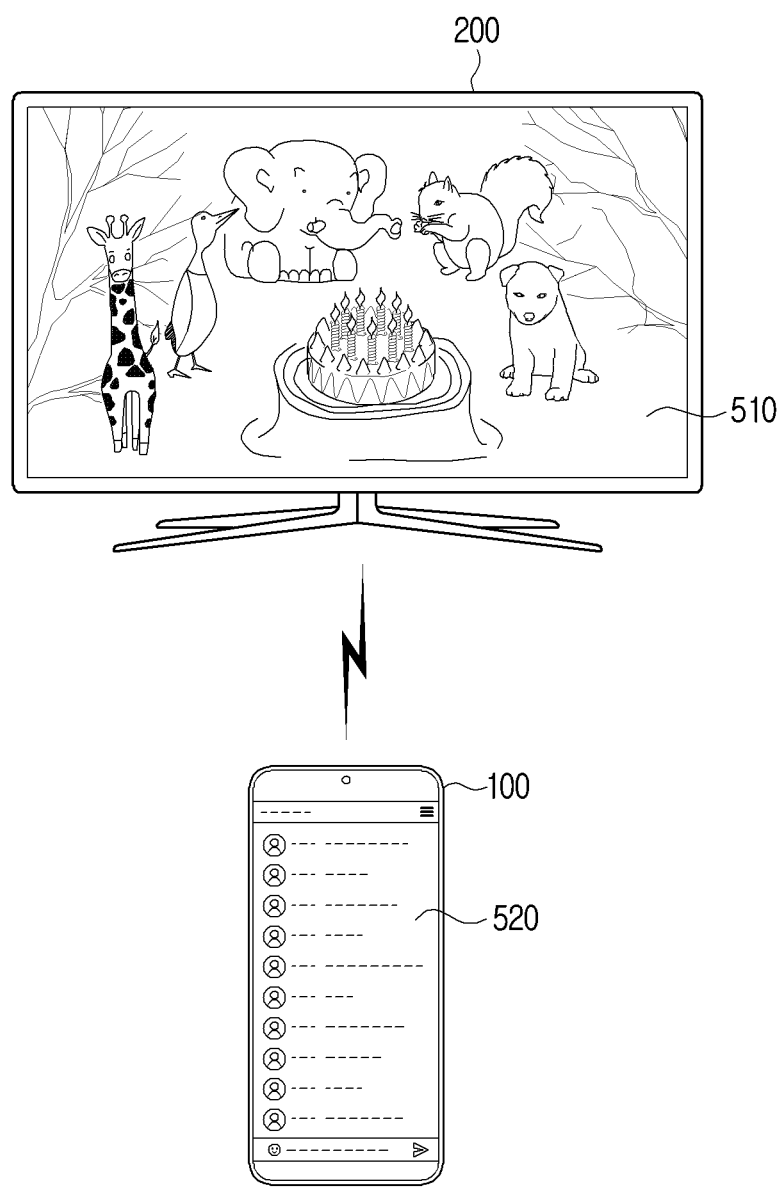
FIG. 5A and FIG. 5B are diagrams illustrating a method for obtaining a capture image according to an embodiment.
Figure 5B:
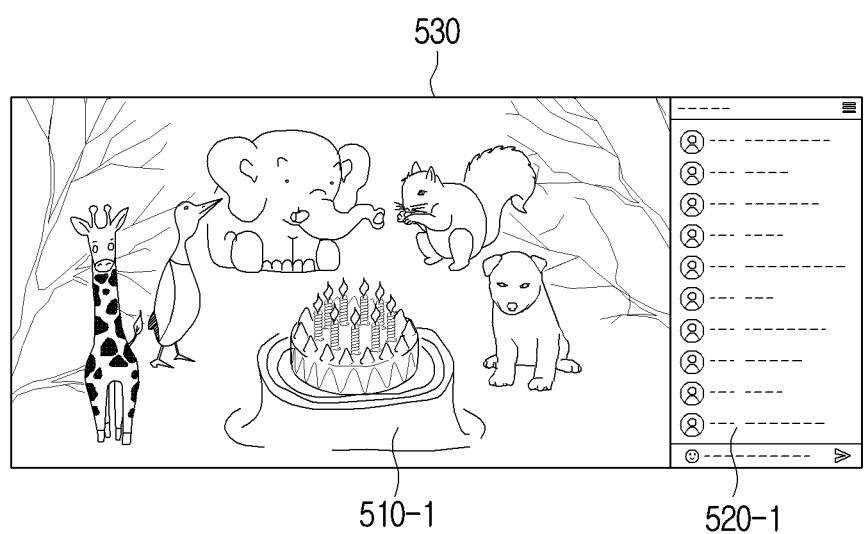

FIG. 5A and FIG. 5B are diagrams illustrating a method for obtaining a capture image according to an embodiment.

In an embodiment, the electronic apparatus 100 is implemented as a smartphone, and the external apparatus 200 is implemented as a TV. In an embodiment, the external apparatus 200 may provide a video content, and the electronic apparatus 100 may provide a chatting content related to the video content provided at the external apparatus 200. For example, the chatting content provided at the electronic apparatus 100 may be a real time chatting screen related to the video content, but is not necessarily limited thereto.

As illustrated in FIG. 5A, if a capture event is identified while the external apparatus 200 provides a video content 510, and the electronic apparatus 100 provides a chatting content 520 related to the video content 510, the electronic apparatus 100 may obtain a first image that captured the video content 510, and obtain a second image that captured the chatting content 520.

As an example, in case a capture event is an event wherein the screen of the external apparatus 200 is photographed through the camera 160, the electronic apparatus 100 may obtain the photographed image as the first image. As another example, in case a capture event is an event wherein the screen of the display 110 is captured, the first image may be received from the external apparatus 200. For example, if an event wherein the screen of the display 110 is captured is identified, the electronic apparatus 100 may transmit a control signal for screen capture to the external apparatus 200, and receive the first image that captured the screen of the external apparatus 200 from the external apparatus 200.

Afterwards, as illustrated in FIG. 5B, the electronic apparatus 100 may obtain a third image 530 including the video content 510 and the chatting content 520 based on the first image 510-1 and the second image 520-1. For example, the third image 530 may be in a form wherein the first image 510-1 including the video content 510 and the second image 520-1 including the chatting content 520 on a specific time point of reproducing the video are combined in left and right directions, but is not necessarily limited thereto. For example, the images may be combined in up and down directions, or may be combined in a form wherein the second image is included inside the first image. Alternatively, the combined form of the first image and the second image may be determined based on the screen ratio of the electronic apparatus 100. Alternatively, the third image may be obtained as the ratio and/or the size of at least one of the first image or the second image is adjusted and then the images are combined, or the third image may be obtained while the ratios and/or the sizes of the first image and the second image are maintained.

As described above, screens of a plurality of devices providing related contents are captured together and stored as one image, and the image can be used in editing and managing afterwards. For example, a differentiated MDE experience of sharing a capture image with other uses can be provided.

Figure 6A:
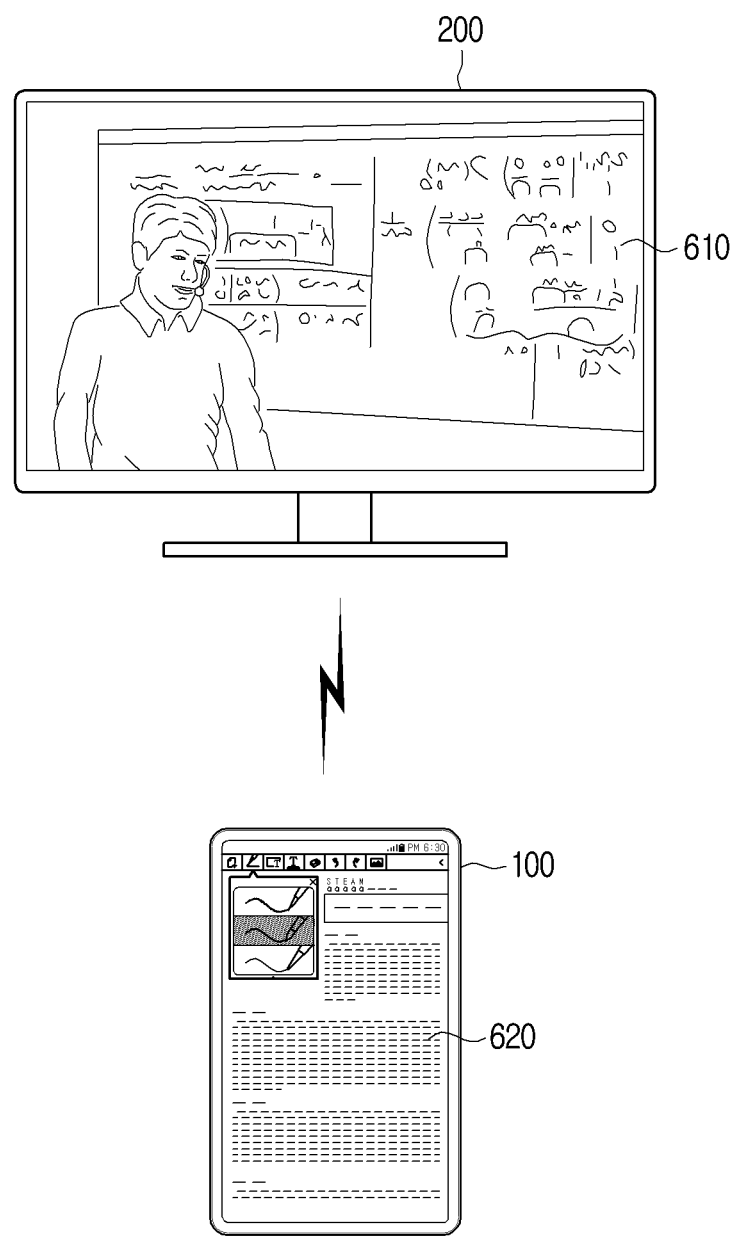
FIG. 6A and FIG. 6B are diagrams illustrating a method for obtaining a capture image according to an embodiment.
Figure 6B:
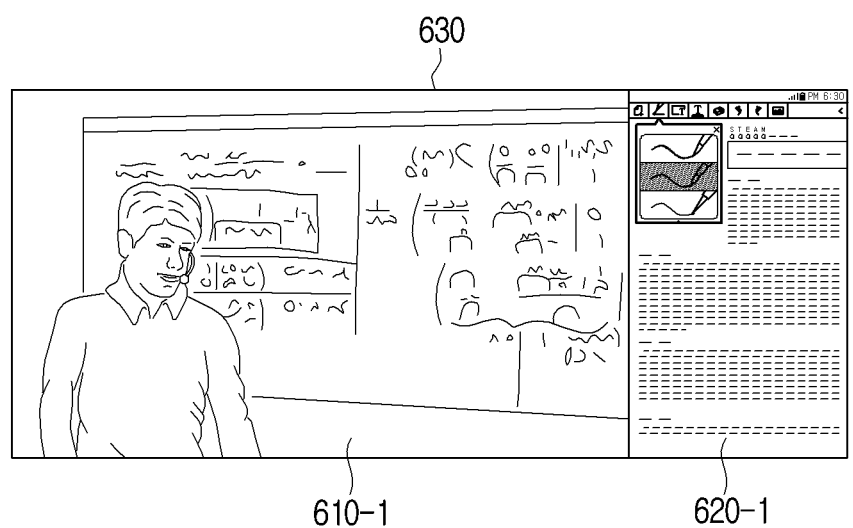

FIG. 6A and FIG. 6B are diagrams illustrating a method for obtaining a capture image according to an embodiment.

In an embodiment, the electronic apparatus 100 is implemented as a tablet, and the external apparatus 200 is implemented as a smart monitor. In an embodiment, the external apparatus 200 may provide an online lecture content, and the electronic apparatus 100 may provide a writing content related to the online lecture content provided at the external apparatus 200. For example, the writing content provided at the electronic apparatus 100 may be a writing screen related to the online lecture content, but is not necessarily limited thereto.

As illustrated in FIG. 6A, if a capture event is identified while the external apparatus 200 provides an online lecture content 610 and the electronic apparatus 100 provides a writing content 620 related to the online lecture content 610, the electronic apparatus 100 may obtain a first image that captured the online lecture content 610, and obtain a second image that captured the user writing content 620 on a specific time point of the lecture. The method of obtaining the first image and/or the second image may be identical/similar to the various embodiments described above in FIG. 3, FIG. 4, and FIG. 5A.

Afterwards, as illustrated in FIG. 6B, the electronic apparatus 100 may obtain a third image 630 including the online lecture content 610 and the writing content 620 based on the first image 610-1 and the second image 620-1. For example, the third image 630 may be in a form wherein the first image 610-1 including the online lecture content 610 and the second image 620-1 including the writing content 620 are combined in left and right directions, but is not necessarily limited thereto, and it may have various combined forms as described in FIG. 5B.

As described above, screens of a plurality of devices providing related contents are captured together and stored as one image, and the image can be used in editing and managing afterwards. For example, a user can be provided with an MDE experience of reviewing necessary parts through a capture image after a lecture is finished.

Figure 7A:
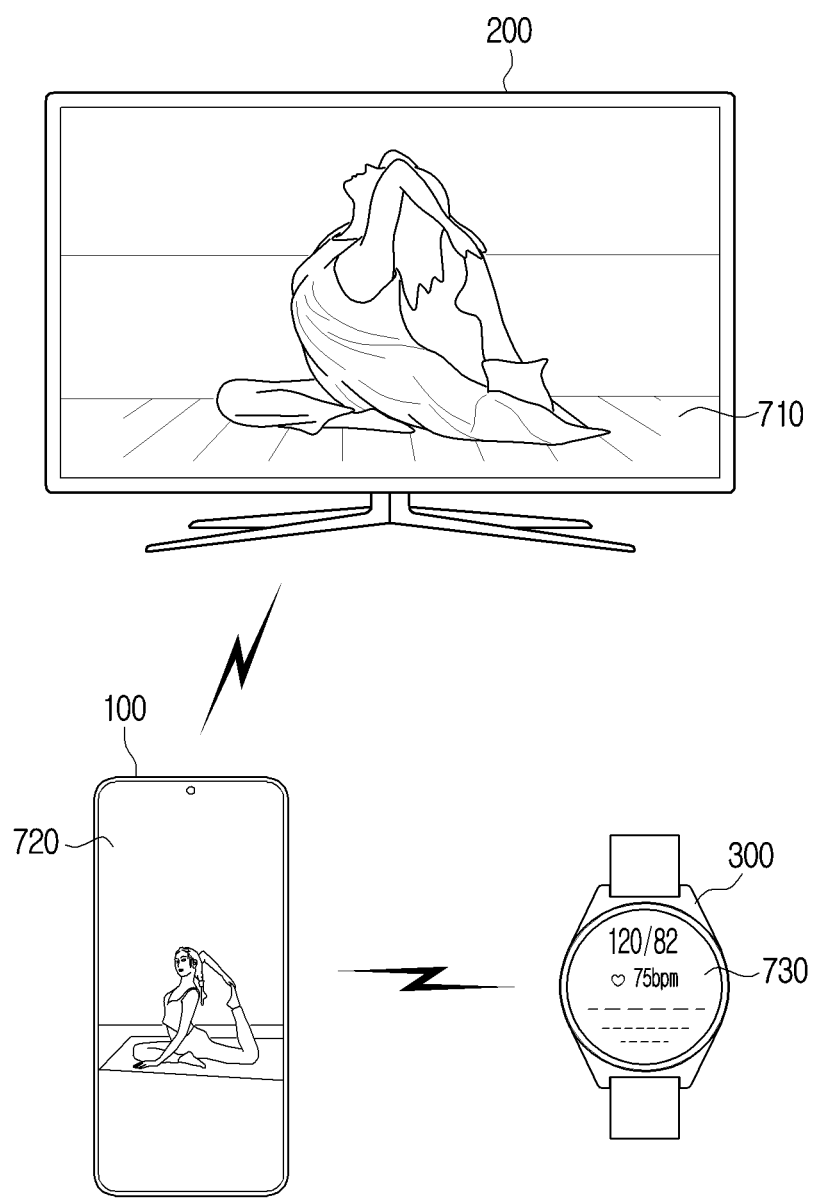
FIG. 7A and FIG. 7B are diagrams illustrating a method for obtaining a capture image according to an embodiment.
Figure 7B:
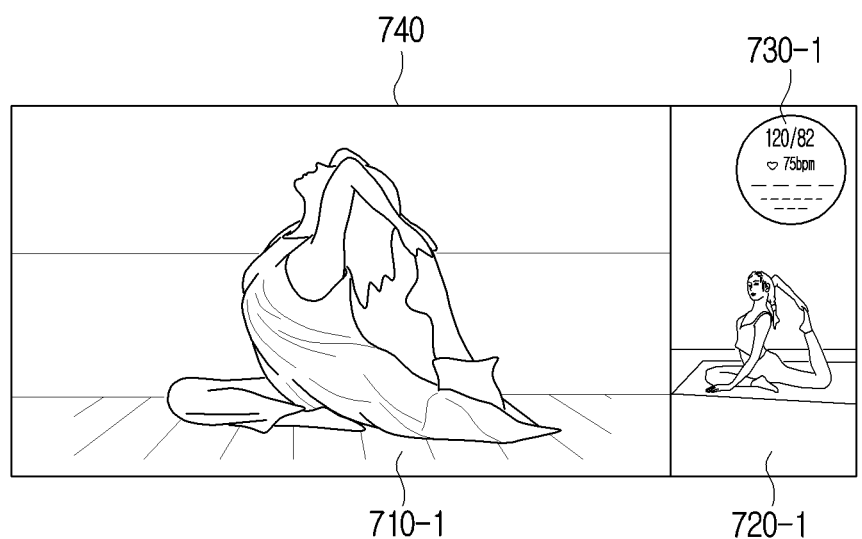

FIG. 7A and FIG. 7B are diagrams illustrating a method for obtaining a capture image according to an embodiment.

In an embodiment, the electronic apparatus 100 is implemented as a smartphone, the first external apparatus 200 is implemented as a TV, and the second external apparatus 300 is implemented as a wearable device worn by a user, e.g., a smartwatch. In an embodiment, the external apparatus 200 may provide a health content (or an exercise content), and the electronic apparatus 100 can provide a photographing content that photographs the user following the moves in the health content provided at the external apparatus 200. For example, it may be a situation wherein the user is exercising while checking the posture by using the camera 160 provided on the electronic apparatus 100, and checking exercise/health/bio information through another external apparatus 300 (i.e., a smartwatch). In an embodiment, the another external apparatus 300 may be in a state of being communicatively connected with the electronic apparatus 100 like the external apparatus 200.

As illustrated in FIG. 7A, if a capture event is identified while the external apparatus 200 provides an exercise content 710 and the electronic apparatus 100 provides a user's photographing content 720 related to the exercise content 710, and the another external apparatus 300 checks the exercise state (or the health state) of the user, the electronic apparatus 100 may obtain a first image that captured the exercise content 710, and obtain a second image that captured the user's photographing content 720 on a specific time point of a posture. The method of obtaining the first image and/or the second image may be identical/similar to the various embodiments described above in FIG. 3, FIG. 4, and FIG. 5A. Also, the electronic apparatus 100 may obtain an image that captured the exercise state (or the health state) information of the user provided at the another external apparatus 300. For example, if a capture event is identified, the electronic apparatus 100 may transmit a control signal for screen capture to the another external apparatus 300, and receive an image that captured the screen of the another external apparatus 300 from the another external apparatus 300.

Afterwards, as illustrated in FIG. 7B, the electronic apparatus 100 may obtain a capture image 740 including the exercise content 710, the photographing content 720, and the exercise state information 730 based on the first image 710-1, the second image 720-1, and the capture image 730-1 of the another external apparatus 300. For example, the third image 740 may be in a form wherein the first image 710-1 including the exercise content 710 and the second image 720-1 including the photographing content 720 are combined in left and right directions, and the image 730-1 including the exercise state information 730 is combined inside the second image 720-1, but is not necessarily limited thereto, and it may have various combined forms as described in FIG. 5B.

According to the aforementioned embodiment, the user can identify how good the state became when the user repeated the same posture periodically through the capture image.

Figure 8A:
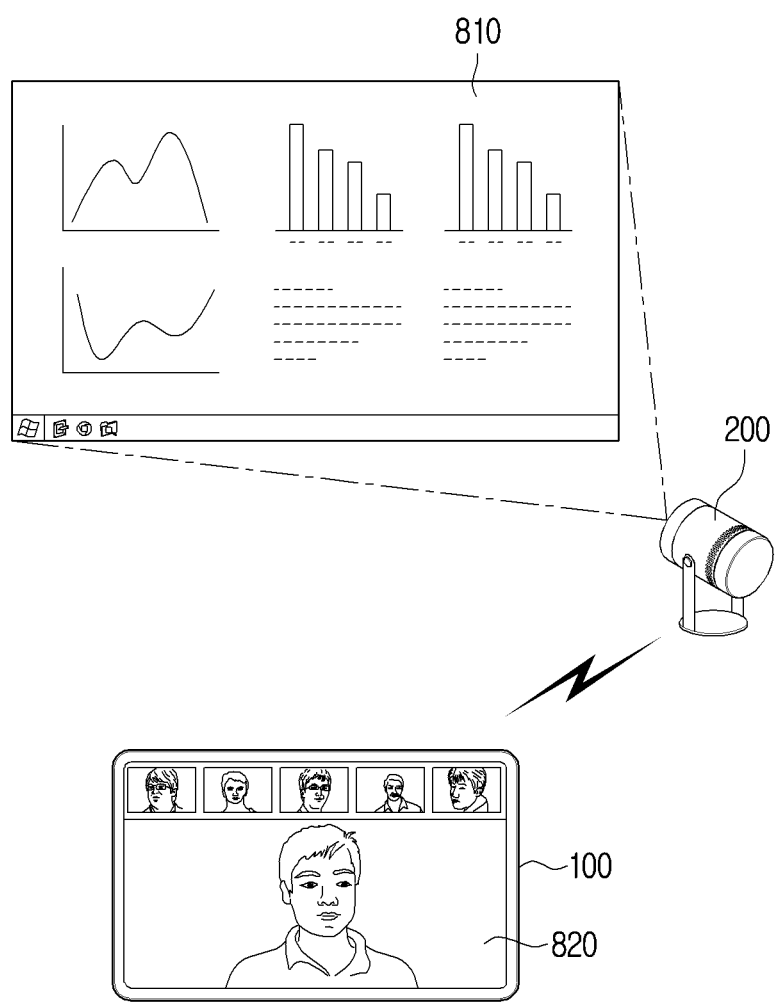
FIG. 8A, FIG. 8B and FIG. 8C are diagrams illustrating a method for obtaining a capture image according to an embodiment.
Figure 8B:
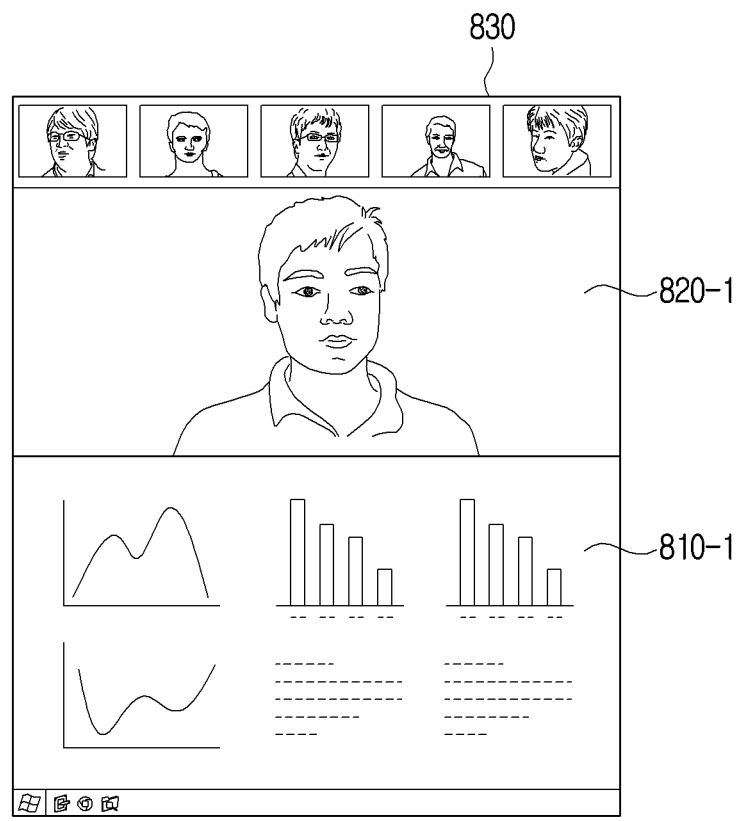

FIG. 8A and FIG. 8B are diagrams illustrating a method for obtaining a capture image according to an embodiment.

In an embodiment, the electronic apparatus 100 is implemented as a tablet, and the external apparatus 200 is implemented as a projector apparatus. In an embodiment, the external apparatus 200 may provide a screen of a video conference material, and the electronic apparatus 100 may provide a content that photographed a user participating in the video conference.

As illustrated in FIG. 8A, if a capture event is identified while the external apparatus 200, i.e., the projector apparatus projects the screen of the video conference material 810 on a projection surface, and the electronic apparatus 100 provides an image of the video conference 820, the electronic apparatus 100 may obtain a first image that captured the screen of the video conference material 810, and obtain a second image that captured the image of the video conference 820. The method of obtaining the first image and/or the second image may be identical/similar to the various embodiments described above in FIG. 3, FIG. 4, and FIG. 5A.

Figure 8C:
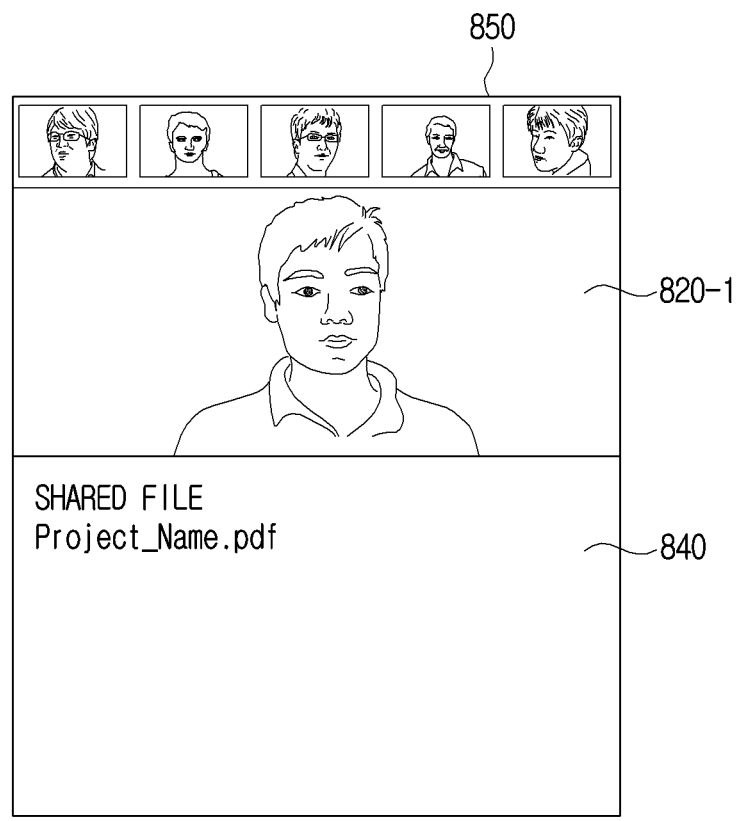

Afterwards, as illustrated in FIG. 8B, the electronic apparatus 100 may obtain a third image 830 including the screen of the video conference material 810 and the image of the video conference 820 based on the first image 810-1 and the second image 820-1. For example, the third image 830 may be in a form wherein the first image 810-1 including the screen of the video conference material 810 and the second image 820-1 including the image of the video conference 820 are combined in left and right directions, but is not necessarily limited thereto, and it may have various combined forms as described in FIG. 5B. Alternatively, as illustrated in FIG. 8C, the electronic apparatus 100 may obtain a capture image 850 including the image of the video conference 820 and a share file 840 based on the second image 820-1 and a file 840 shared in the video conference. Obviously, depending on cases, a capture image including the screen of the video conference material 810, the image of the video conference 820, and the share file 840 may be obtained.

According to the aforementioned embodiment, a video conference material, a video conference image, a share file, etc. are captured together, and thus the situation of the video conference can be shared with other users later.

Figure 9A:
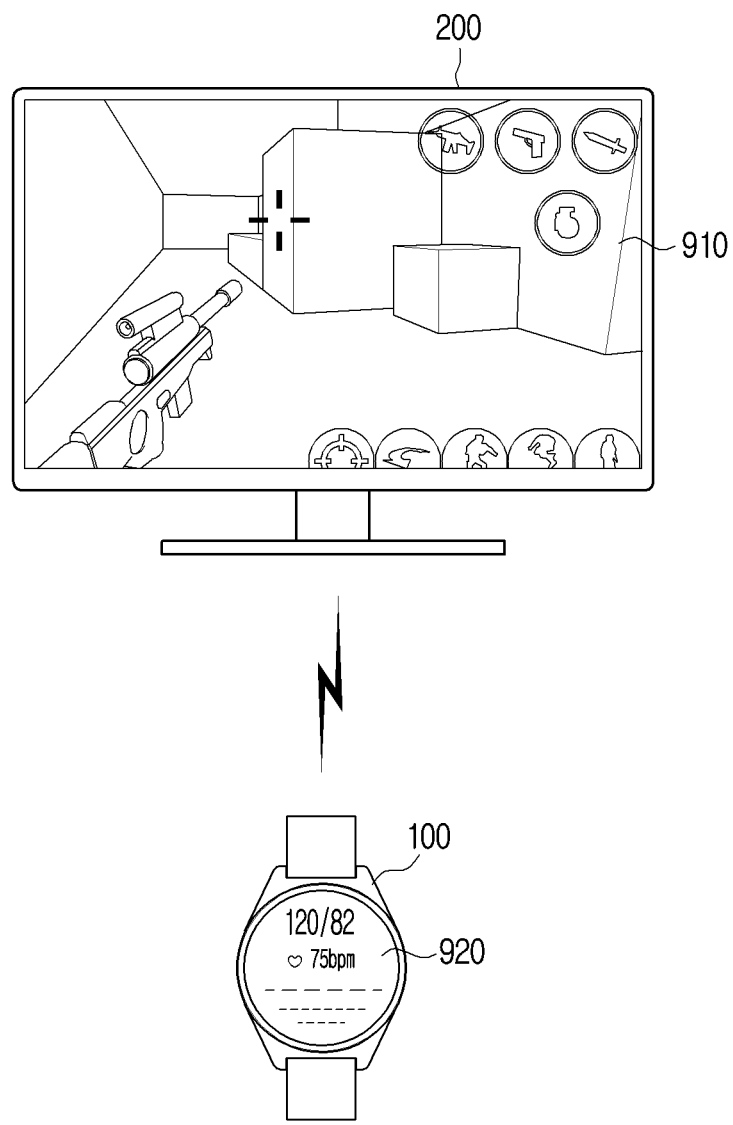
FIG. 9A and FIG. 9B are diagrams illustrating a method for obtaining a capture image according to an embodiment.
Figure 9B:
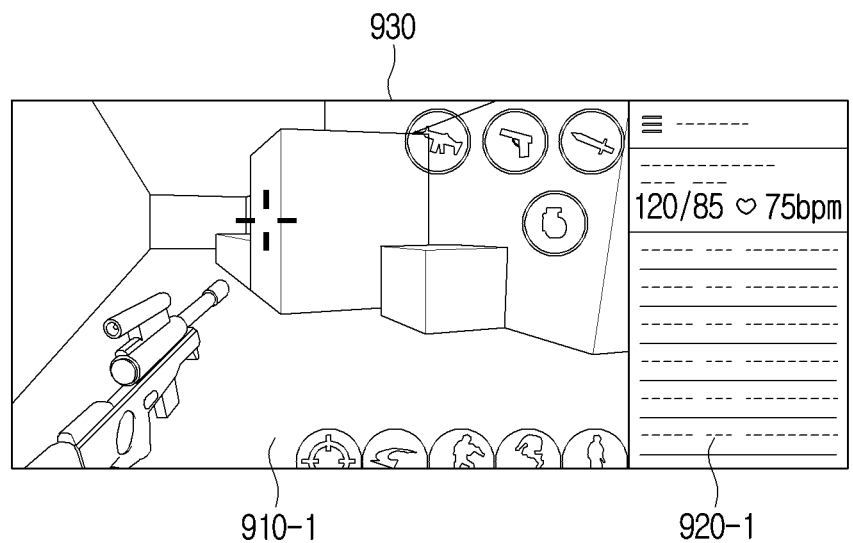

FIG. 9A and FIG. 9B are diagrams illustrating a method for obtaining a capture image according to an embodiment.

In an embodiment, the electronic apparatus 100 is implemented as a wearable device, and the external apparatus 200 is implemented as a smart monitor. In an embodiment, the external apparatus 200 may provide a content such as a game content, a movie content, etc., and the electronic apparatus 100 is implemented as a smart watch and measure health information of the user while the user plays or views the content, and provide the information.

As illustrated in FIG. 9A, if the health information satisfies a predetermined condition while the external apparatus 200 provides a game content 910 and the electronic apparatus 100 measures the health information of the user, the electronic apparatus 100 may obtain a first image that captured the game content 910, and obtain a second image that captured the health information 920 on the time point of capture. That is, an event wherein the health information of the user satisfies the predetermined condition may be identified as a capture event. For example, in case the heart rate of the user is greater than or equal to a predetermined heart rate, the event may be identified as a capture event.

In this case, as illustrated in FIG. 9B, the electronic apparatus 100 may obtain a third image 930 including the game content 910 and the health content 920 based on the first image 910-1 and the second image 920-1. For example, the third image 930 may be in a form wherein the first image 910-1 including the game content 910 and the second image 920-1 including the health information 920 are combined in left and right directions, but is not necessarily limited thereto, and it may have various combined forms as described in FIG. 5B. In an embodiment, the second image 920-1 may be an image wherein the screen of the electronic apparatus 100 is captured as it is, but it may also be an image in a form wherein information provided to the electronic apparatus 100 is re-arranged, as illustrated in FIG. 9B. That is, information provided on the screen of the electronic apparatus 100 on a time point wherein a capture event of the electronic apparatus 100 is identified may be stored as the second image 920-1.

According to the aforementioned embodiment, it can be identified in which part in which image the user was startled or tense when viewing a specific content, and the information may be used in recommendation of a content, health care of the user, etc. later.

Figure 10A:
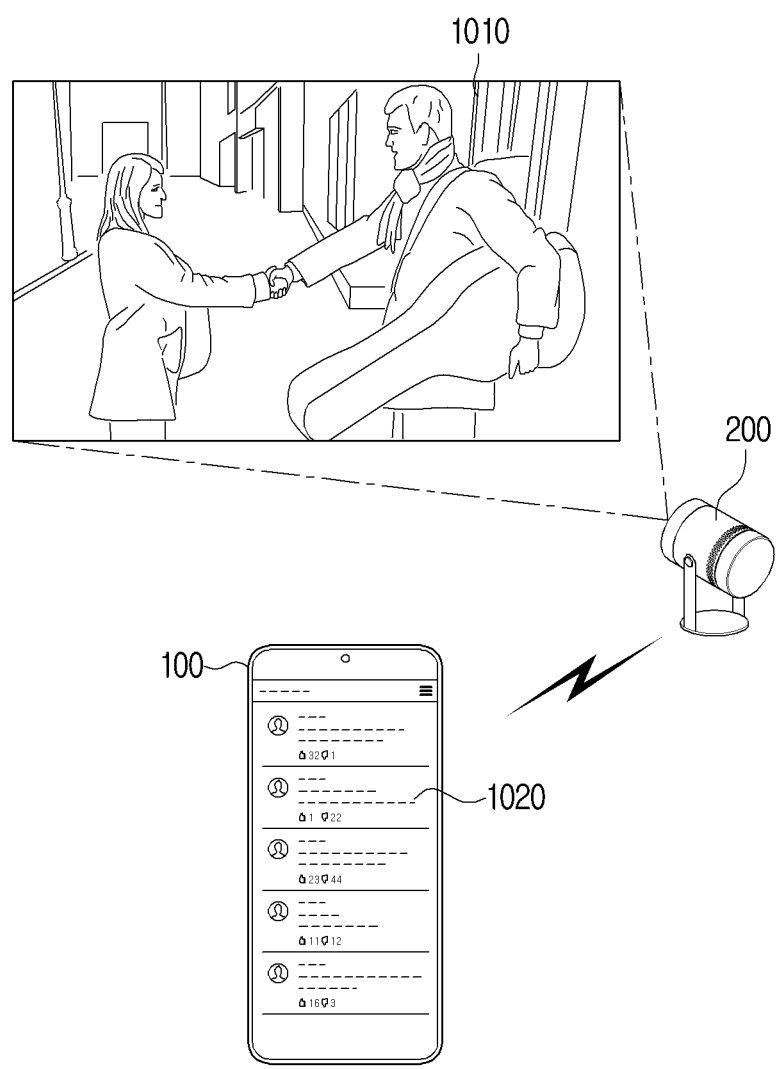
FIG. 10A and FIG. 10B are diagrams illustrating a method for obtaining a capture image according to an embodiment.
Figure 10B:
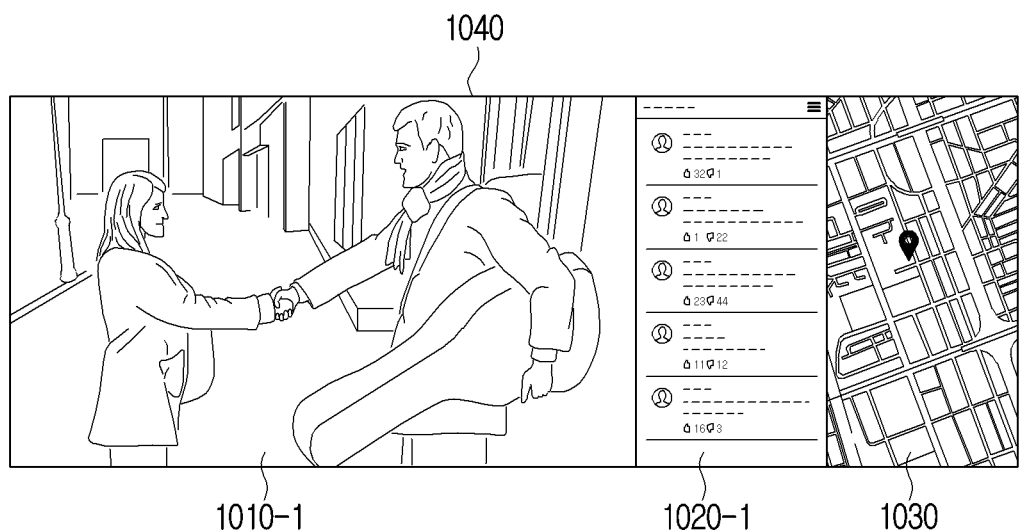

FIG. 10A and FIG. 10B are diagrams illustrating a method for obtaining a capture image according to an embodiment.

In an embodiment, the electronic apparatus 100 is implemented as a smartphone, and the external apparatus 200 is implemented as a projector device. In an embodiment, the external apparatus 200 may provide an image content, and the electronic apparatus 100 may provide additional information on the image content.

As illustrated in FIG. 10A, if a capture event is identified while the external apparatus 200, i.e., the projector apparatus projects a movie content 1010 on the projection surface, and the electronic apparatus 100 provides a UI screen 1020 including a review for the movie content, the electronic apparatus 100 may obtain a first image that captured the movie content 1010, and obtain a second image that captured the UI screen 1020 including the review. The method of obtaining the first image and/or the second image may be identical/similar to the various embodiments described above in FIG. 3, FIG. 4, and FIG. 5A.

Afterwards, as illustrated in FIG. 10B, the electronic apparatus 100 may obtain not only the first image 1010-1 and the second image 1020-1, but also a third image 1040 including the video movie content 1010, the UI screen 1020 including the review, and context information based on the context information of the electronic apparatus 100. For example, the context information may include location information of the electronic apparatus 100 when the capture event was identified. Accordingly, the third image 1040 may include the map image 1030 including the video movie content 1010, the UI screen 1020 including the review, and the location information (e.g., GPS information).

According to the aforementioned embodiment, a user's UX experience can be improved as the user captures not only additional information for an image content that the user viewed (e.g., a review), but also context information at the time of viewing and stores the information, and utilizes the image later such as sharing it with another user, etc.

Figure 11:
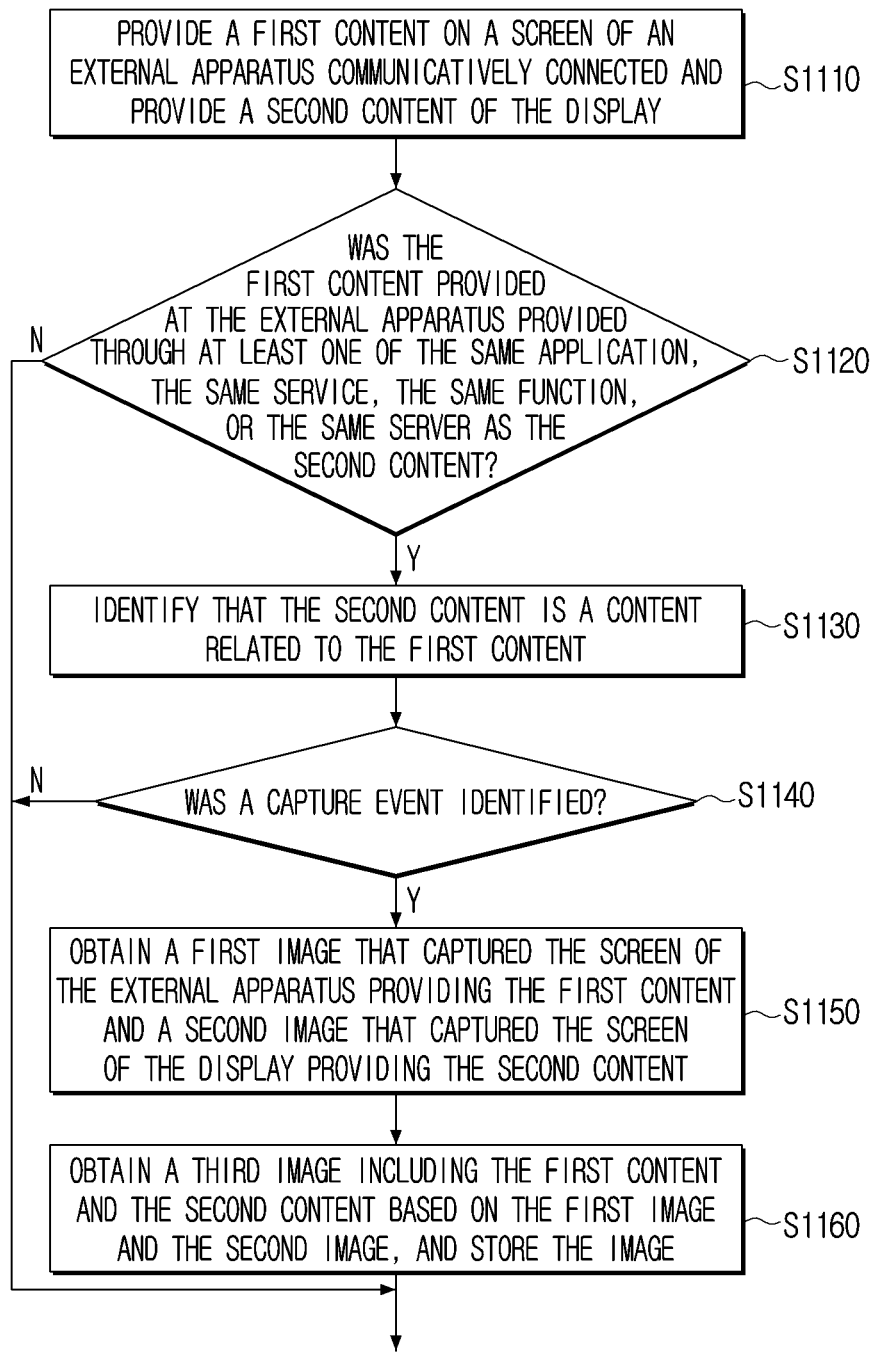
FIG. 11 is a diagram illustrating a method for obtaining a capture image of an electronic apparatus according to one or more embodiments.

FIG. 11 is a diagram for illustrating a method for obtaining a capture image of the electronic apparatus 100 according to one or more embodiments.

As illustrated in FIG. 11, the processor 140 may provide a first content on the screen of the external apparatus 200 communicatively connected through the communication interface 120, and provide a second content related to the first content on the screen of the display 110 in operation S1110.

The processor 140 may identify whether the first content provided from the external apparatus 200 is provided through at least one of the same application, the same service, the same function, or the same server as the second content provided at the electronic apparatus 100 in operation S1120.

If it is identified that the first content is provided through at least one of the same application, the same service, the same function, or the same server as the second content in operation S1120:YES, the processor 140 may identify that the second content is a content related to the first content in operation S1130. For example, the processor 140 may receive information on the application that is being executed by the external apparatus 200, the provided service, the provided function, or the server that is being accessed, etc. from the external apparatus 200, and identify whether the first content is provided through at least one of the same application, the same service, the same function, or the same server as the second content. Alternatively, the processor 140 may identify whether the electronic apparatus 100 and the external apparatus 200 provide the same function based on the type of the external apparatus 200. For example, in case a health care function is being provided at the electronic apparatus 100, and the type of the external apparatus 200 is a wearable device providing a health care function, the processor 140 may identify that the electronic apparatus 100 and the external apparatus 200 provide the same function.

In this case, if a capture event is identified in operation S1140:YES, the processor 140 may identify a first image that captured the screen of the external apparatus 200 providing the first content and a second image that captured the screen of the display 110 providing the second content in operation S1150. Here, the capture event may include at least one of an event wherein the screen of the external apparatus 200 is photographed through the camera 160 provided on the electronic apparatus 100, an event wherein the screen of the display 110 is captured, an event wherein a predetermined button is manipulated, an event wherein a predetermined menu is selected, or an event wherein a predetermined condition is satisfied in the electronic apparatus 100 or the external apparatus 200.

Then, the processor 140 may obtain a third image including the first content and the second content based on the first image and the second image, and store the image in the memory 130 in operation S1160.

As an example, the embodiment illustrated in FIG. 8A and FIG. 8B may be a case wherein the same video call application is executed at the electronic apparatus 100 and the external apparatus 200. The video call application may be provided in the form of an icon interface on the screen of the electronic apparatus 100 and the screen of the external apparatus 200, and when the video call application is respectively executed, a screen of a video conference material 810 and an image of the video conference 820 may be provided through the execution screens of the video call application. In an embodiment, the screen of the video conference material 810 and the image of the video conference 820 may be shared among a plurality of devices that participated in a plurality of video conferences through an external server communicating with the video call application. In case the screen of the video conference material 810 and the image of the video conference 820 are provided through the execution screens of the same video call application, the electronic apparatus 100 may identify that the screen of the video conference material 810 and the image of the video conference 820 are related contents.

As another example, the embodiment illustrated in FIG. 7A and FIG. 7B may be a case wherein the electronic apparatus 100 and the external apparatus 200 provide the same service, and the electronic apparatus 100 and another external apparatus 300 provide the same function. For example, an exercise content 710 provided by the external apparatus 200 and a user's photographing content 720 provided by the electronic apparatus 100 may be connected through the same service (or the same server). Also, the user's photographing content 720 provided at the electronic apparatus 100 and exercise state information 730 provided at the another external apparatus 300 may be provided by the same function (e.g., a health care function). For example, the electronic apparatus 100 may identify whether the user's photographing content 720 and the exercise state information 730 are provided by the same function based on the function information received from the another external apparatus 300 or the type information of the another external apparatus 300.

In this case, the electronic apparatus 100 may identify that the exercise content 710 and the photographing content 720 are related contents, and identify that the photographing content 720 and the exercise state information 730 are related contents.

Figure 12:
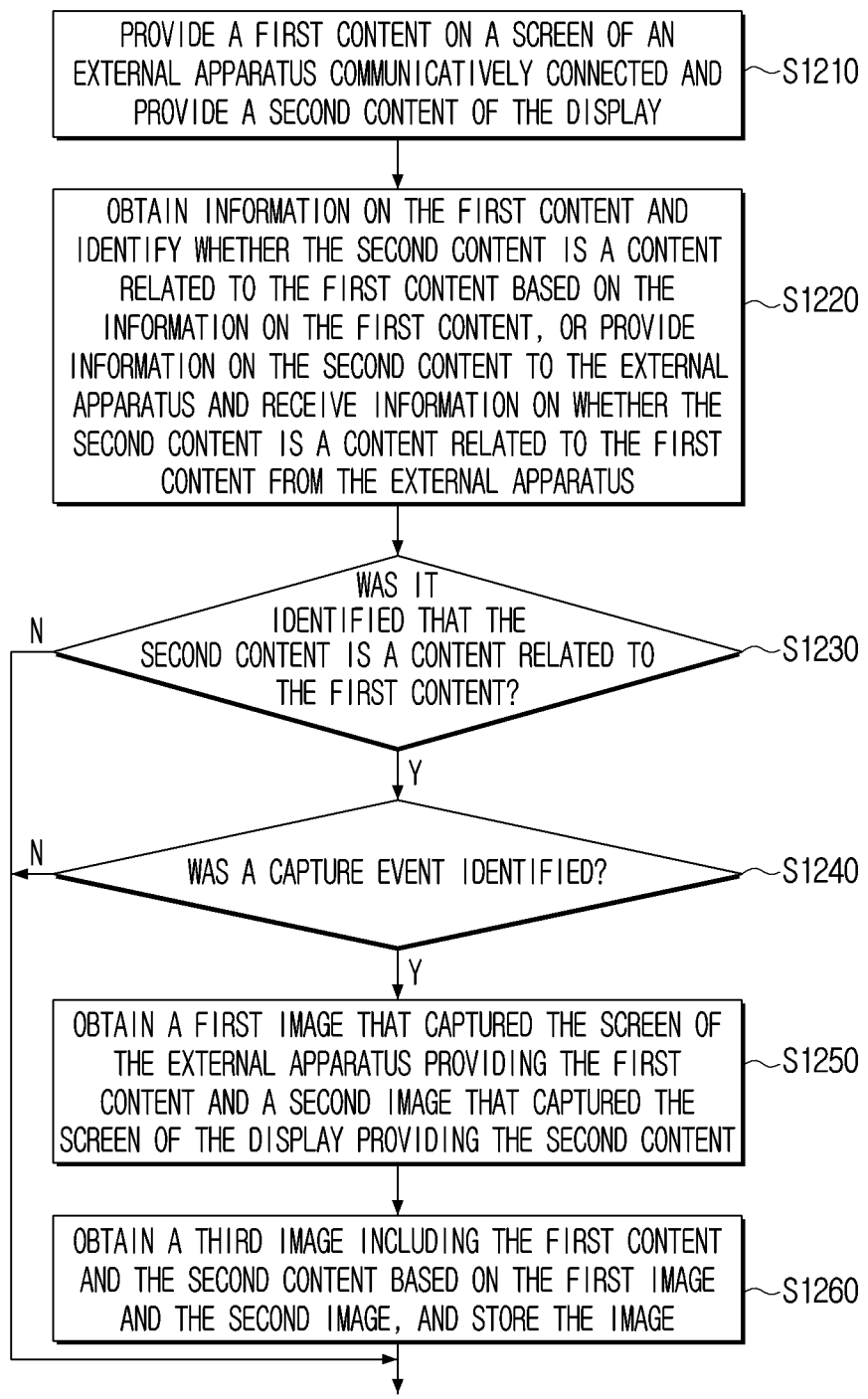
FIG. 12 is a diagram illustrating a method for obtaining a capture image of an electronic apparatus according to one or more embodiments.

FIG. 12 is a diagram for illustrating a method for obtaining a capture image of the electronic apparatus 100 according to one or more embodiments.

As illustrated in FIG. 12, the processor 140 may provide a first content on the screen of the external apparatus 200 communicatively connected through the communication interface 120 and provide a second content related to the first content on the screen of the display 110 in operation S1210.

The processor 140 may obtain information on the first content and identify whether the second content is a content related to the first content based on the information on the first content, or provide information on the second content to the external apparatus 200, and receive information on whether the second content is a content related to the first content from the external apparatus 200 in operation S1220. In an embodiment, the processor 140 may identify whether the first content and the second content are related contents by using a trained neural network model. For example, the processor 140 may input the information on the first content and the information on the second content into the trained neural network model, and obtain identification information on whether the contents are related contents as output information.

If it is identified that the second content is a content related to the first content in operation S1230:YES, and a capture event is identified in operation S1240:YES, the processor 140 may obtain a first image that captured the screen of the external apparatus 200 providing the first content and a second image that captured the screen of the display 110 providing the second content in operation S1250. Here, the capture event may include at least one of an event wherein the screen of the external apparatus 200 is photographed through the camera 160 provided on the electronic apparatus 100, an event wherein the screen of the display 110 is captured, an event wherein a predetermined button is manipulated, an event wherein a predetermined menu is selected, or an event wherein a predetermined condition is satisfied in the electronic apparatus 100 or the external apparatus 200.

Then, the processor 140 may obtain a third image including the first content and the second content based on the first image and the second image, and store the image in the memory 130 in operation S1260.

As an example, in the embodiment illustrated in FIG. 10A, the electronic apparatus 100 may receive an image content and/or metadata (e.g., title information, cast information, etc.) from the external apparatus 200 and analyze the first content 1010 provided from the external apparatus 200, and analyze the second content 1020 provided from the electronic apparatus 100, i.e., information on a movie review (e.g., title information, cast information, etc.), and identify whether the second content is a content related to the first content. In an embodiment, as illustrated in FIG. 10A, it can be determined whether the first content 1010 and the second content 1020 are related contents by identifying whether the contents are provided through the same application, the same service, the same server, etc.

Figure 13:
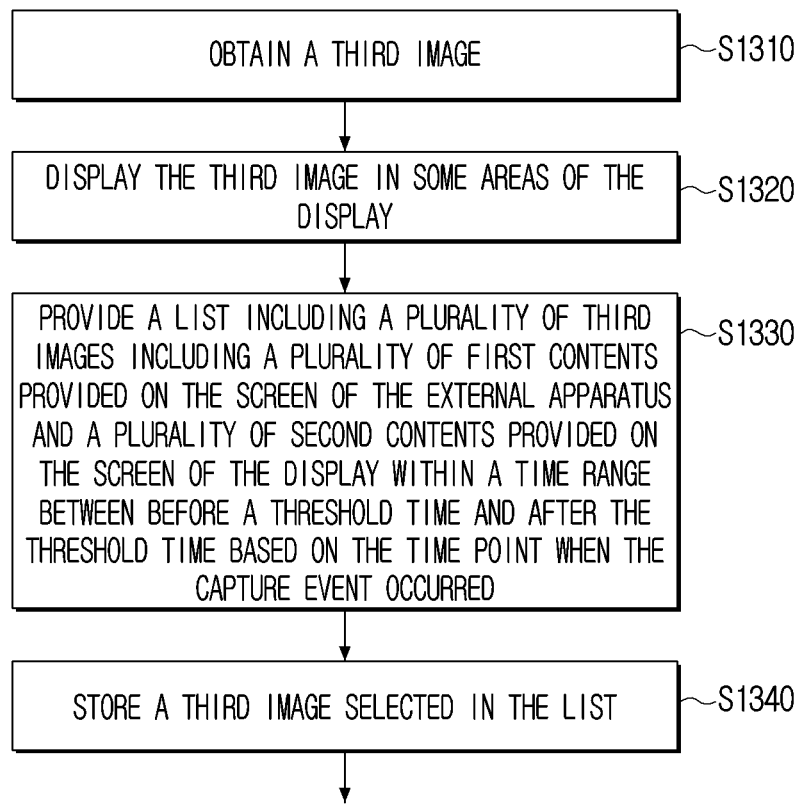
FIG. 13, FIG. 14A, and FIG. 14B are diagrams illustrating a method for providing a capture image of an electronic apparatus according to one or more embodiments.
Figure 14A:
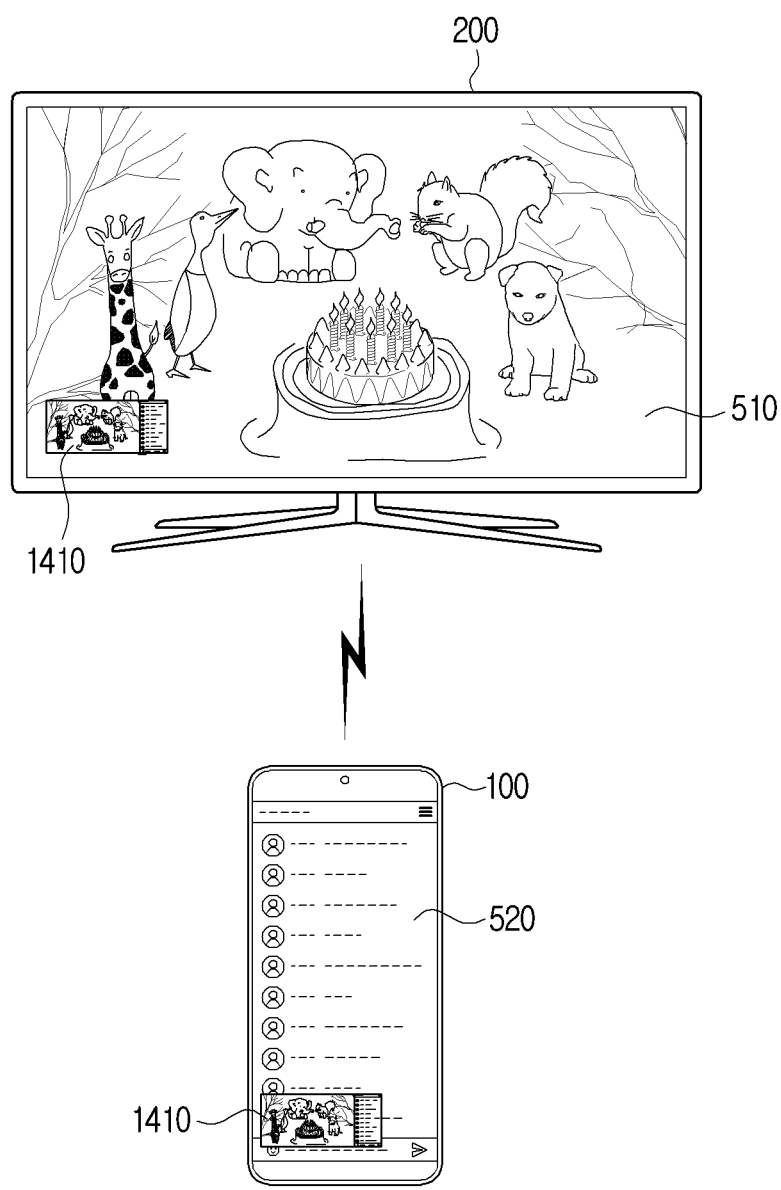
Figure 14B:
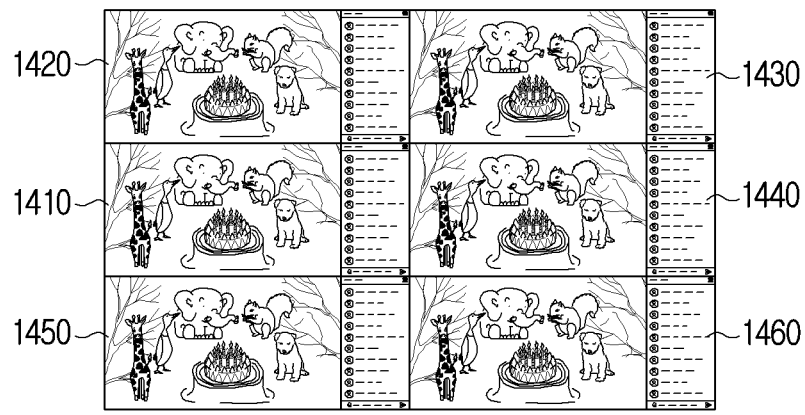

FIG. 13, FIG. 14A, and FIG. 14B are diagrams for illustrating a method for providing a capture image of the electronic apparatus 100 according to one or more embodiments.

According to the embodiment illustrated in FIG. 13, if a third image, i.e., a capture image is obtained according to the aforementioned various embodiments in operation S1310, the processor 140 may display the third image in some areas of the display 110 in operation S1320.

For example, as illustrated in FIG. 14A, if a capture image 1410 including a video content 510 provided at the external apparatus 200 and a chatting content 520 provided at the electronic apparatus (refer to FIG. 5A) is obtained according to a capture event while the electronic apparatus 100 and the external apparatus 200 are communicatively connected, the processor 140 may display the capture image 1410 in one area of the screen of at least one of the electronic apparatus 100 or the external apparatus 200.

Also, the processor 140 may provide a list including a plurality of third images including a plurality of first contents provided on the screen of the external apparatus 200 and a plurality of second contents provided on the screen of the display 110 within a time range between before a first threshold time and after a second threshold time based on the time point when the capture event was identified through the display 110 in operation S1330. Here, the first threshold time and the second threshold time may be identical or different. In an embodiment, the electronic apparatus 100 may provide the list at the external apparatus 200 by transmitting the list to the external apparatus 200.

For example, if the capture image 1410 displayed in one area of the screen is selected in FIG. 14A, a list including the images 1420, 1430 that were captured before the time point of capturing the capture image 1410 and the images 1440, 1450, 1460 that were captured after the time point of capturing may be provided as illustrated in FIG. 14B.

Afterwards, the processor 140 may store a third image selected among the plurality of third images included in the list as the final capture image in the memory 130 in operation S1340. For example, if a specific capture image 1440 is selected among the capture images 1410 to 1460 included in the list, the processor 140 may store the selected capture image 1440 as the final capture image.

Figure 15:
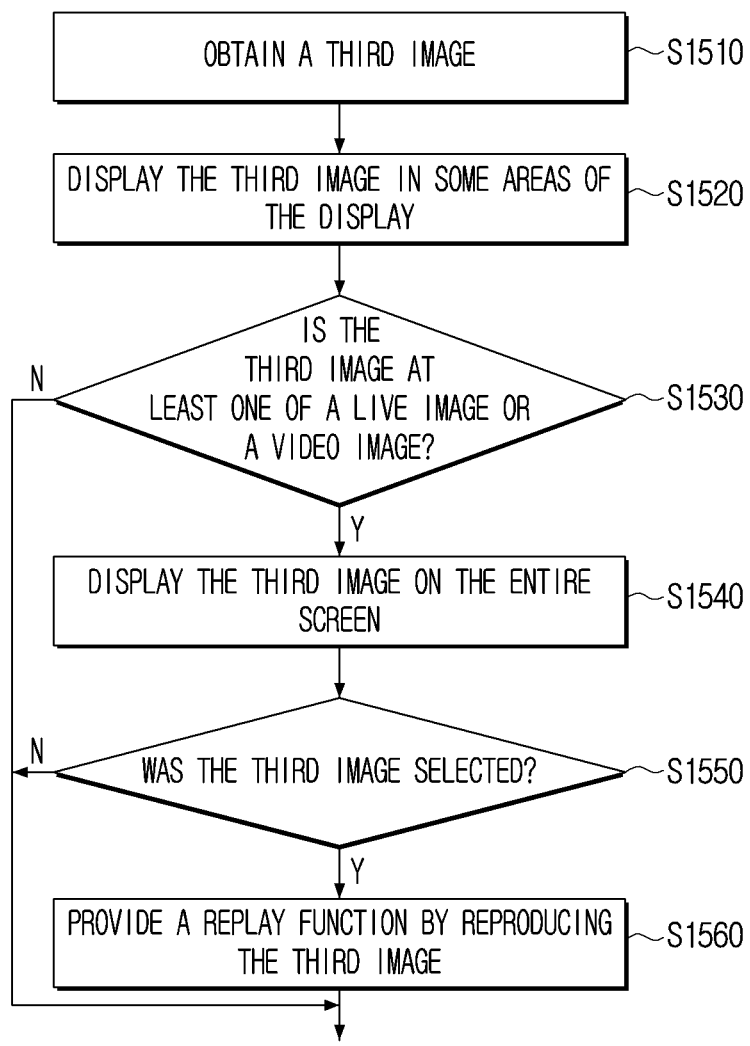
FIG. 15, FIG. 16A, and FIG. 16B are diagrams illustrating a method for providing a capture image of an electronic apparatus according to one or more embodiments.
Figure 16A:
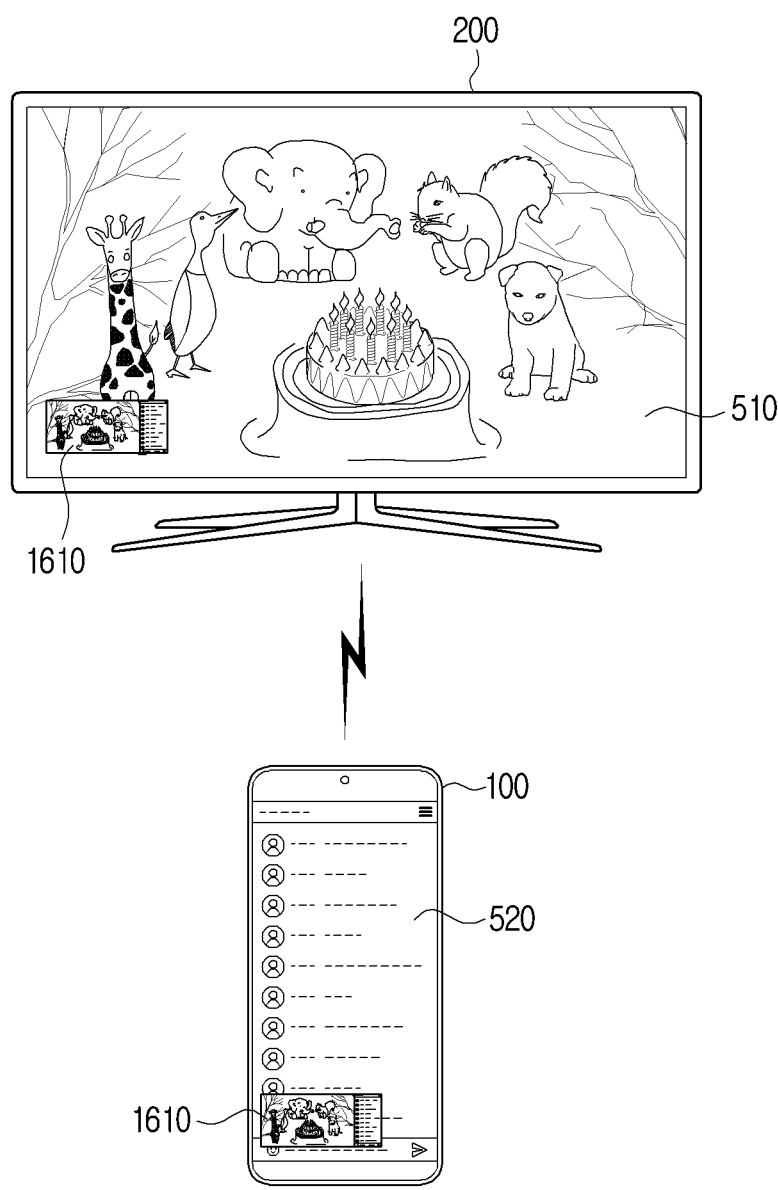
Figure 16B:
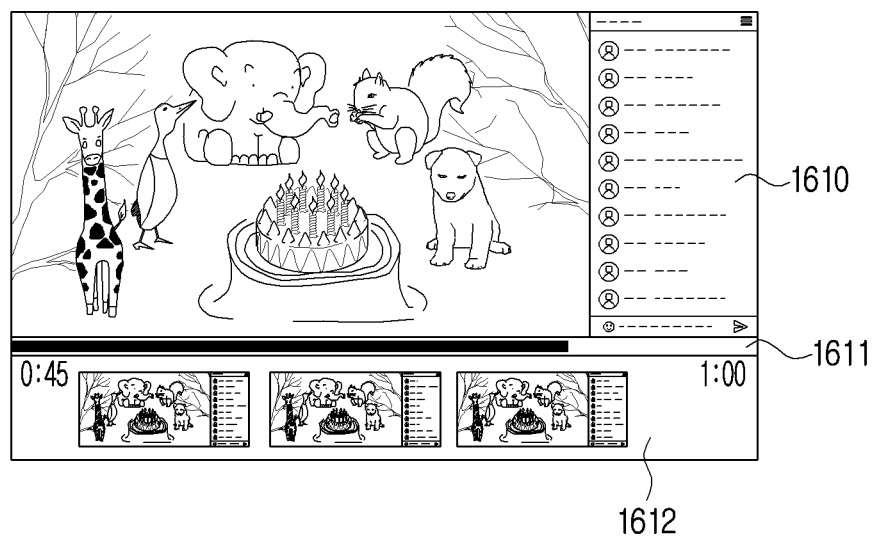

FIG. 15, FIG. 16A, and FIG. 16B are diagrams for illustrating a method for providing a capture image of the electronic apparatus 100 according to one or more embodiments.

According to the embodiment illustrated in FIG. 15, if a third image, i.e., a capture image is obtained according to the aforementioned various embodiments in operation S1510, the processor 140 may display the third image in some areas of the display 110 in operation S1520.

For example, as illustrated in FIG. 16A, if a capture image 1610 including a video content 510 provided at the external apparatus 200 and a chatting content 520 provided at the electronic apparatus 100 (refer to FIG. 5A) is obtained according to a capture event while the electronic apparatus 100 and the external apparatus 200 are communicatively connected, the processor 140 may display the capture image 1610 in one area of the screen of at least one of the electronic apparatus 100 or the external apparatus 200.

If the third image is at least one of a live image or a video image in operation S1530:YES, the processor 140 may display the third image on the entire screen of the display 110 in operation S1540.

Afterwards, if the third image displayed on the entire screen is selected in operation S1550:YES, the processor 140 may provide a replay function by reproducing the third image in operation S1560.

For example, as illustrated in FIG. 16B, if the capture image 1610 is at least one of a live image or a video image, the processor 140 may provide the replay function by providing the capture image 1610 on the entire screen. For example, the processor 140 may provide the replay function for a desired section by providing a play bar 1611, information on the length of the video, and information on the reproduction time 1612, etc. In an embodiment, provision of the capture image 1610 on the entire screen is not limited to the electronic apparatus 100, and the capture image 1610 may be provided on the entire screen of the external apparatus 200. For example, the electronic apparatus 100 may transmit the capture image 1610 to the external apparatus 200, and the capture image 1610 may be provided on the entire screen of the external apparatus 200.

Figure 17:
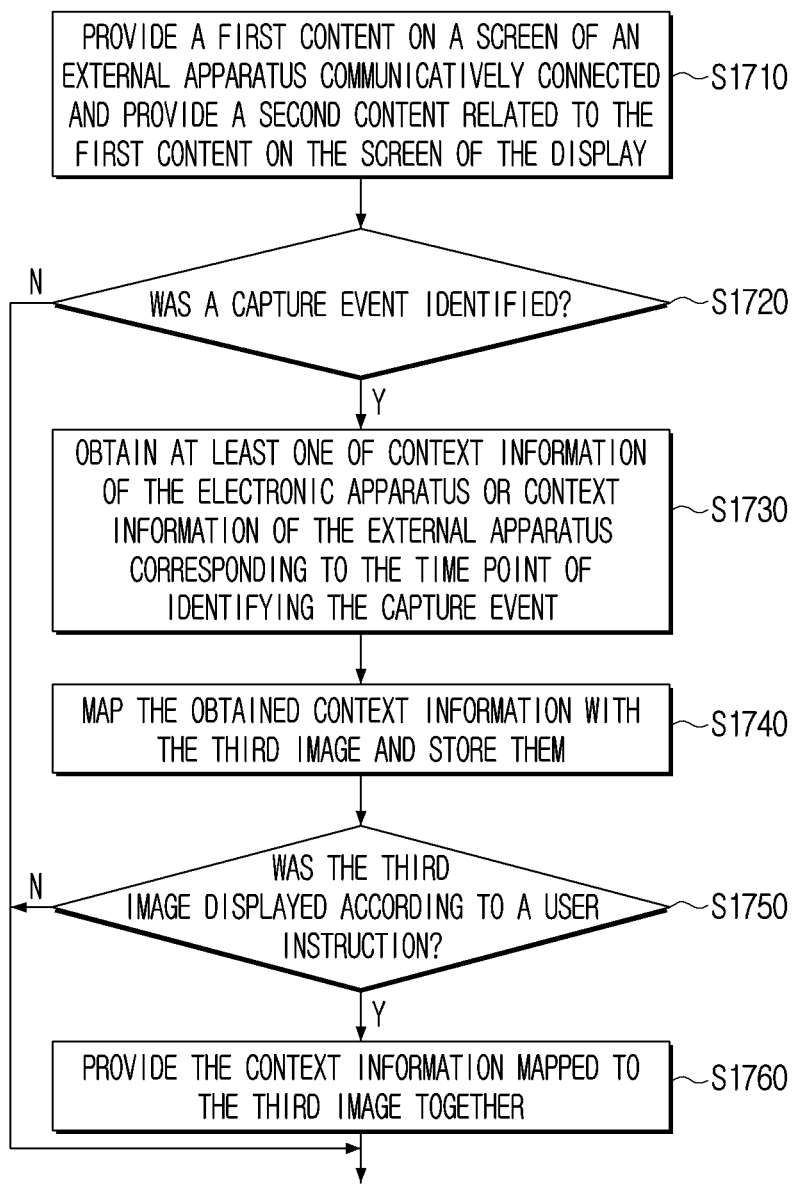
FIG. 17 is a diagram illustrating a method for obtaining a capture image of an electronic apparatus according to one or more embodiments.

FIG. 17 is a diagram for illustrating a method for obtaining a capture image of the electronic apparatus 100 according to one or more embodiments.

As illustrated in FIG. 17, the processor 140 may provide a first content on the screen of the external apparatus 200 communicatively connected through the communication interface 120 and provide a second content related to the first content on the screen of the display 110 in operation S1710.

If a capture event is identified in operation S1720:YES, the processor 140 may obtain at least one of context information of the electronic apparatus 100 or context information of the external apparatus 200 corresponding to the time point of identifying the capture event in operation S1730.

Then, the processor 140 may map the obtained context information with the third image, and store them in the memory 130 in operation S1740.

Afterwards, when the third image is displayed according to a user instruction in operation S1750:YES, the processor 140 may provide the context information mapped to the third image together in operation S1760.

As an example, the electronic apparatus 100 may obtain the context information of the electronic apparatus 100 corresponding to the time point of identifying the capture event, e.g., location information obtained through the sensor 170, illumination information, or weather information received from an external server, etc. Also, the electronic apparatus 100 may receive the context information of the external apparatus 200 corresponding to the time point of identifying the capture event, e.g., location information, illumination information, or weather information received from an external server, etc. from the external apparatus 200. In this case, the electronic apparatus 100 may map the obtained context information with the third image and store them, and in case the third image is displayed according to a user instruction, provide the mapped information together.

According to the aforementioned various example embodiments, in case a plurality of devices are communicatively connected and used, the screens of the plurality of devices are captured together and stored according to a user's capture instruction, and the capture image is provided according to the user's need, and accordingly, a differentiated MDE experience can be provided. Also, not only screen information but also context information of each device is mapped to the capture image and stored, and accordingly, the user's UX experience can be improved.

The methods according to the aforementioned various embodiments of the disclosure may be implemented in forms of applications that can be installed on conventional electronic apparatuses. Alternatively, the methods according to the aforementioned various embodiments of the disclosure, e.g., determination of related contents may be performed by using an artificial neural network based on deep learning (or a deep artificial neural network), i.e., a learning network model.

Also, the methods according to the aforementioned various embodiments of the disclosure may be implemented just with software upgrade, or hardware upgrade of conventional electronic apparatuses.

In addition, the aforementioned various embodiments of the disclosure may be performed through an embedded server provided on an electronic apparatus, or an external server of an electronic apparatus.

Also, the aforementioned various embodiments may be implemented as software including instructions stored in machine-readable storage media, which can be read by machines (e.g., computers). The machines refer to apparatuses that call instructions stored in a storage medium, and can operate according to the called instructions, and the apparatuses may include an electronic apparatus according to the aforementioned embodiments (e.g., an electronic apparatus A). In case an instruction is executed by a processor, the processor may perform a function corresponding to the instruction by itself, or by using other components under its control. An instruction may include a code that is generated or executed by a compiler or an interpreter. A storage medium that is readable by machines may be stored in the form of a non-transitory storage medium. Here, the term 'non-transitory' only means that a storage medium is a tangible device, and does not include a signal, and the term does not distinguish a case wherein data is stored in the storage medium semi-permanently and a case wherein data is stored temporarily.

Also, the methods according to the aforementioned various embodiments may be provided while being included in a computer program product. A computer program product refers to a product, and it can be traded between a seller and a buyer. A computer program product can be distributed in the form of a storage medium that is readable by machines (e.g., a compact disc read only memory (CD-ROM)), or may be distributed on-line through an application store (e.g., Play Store™). In the case of on-line distribution, at least a portion of a computer program product may be stored in a storage medium such as the server of the manufacturer, the server of the application store, and the memory of the relay server at least temporarily, or may be generated temporarily.

In addition, each of the components (e.g., a module or a program) according to the aforementioned various embodiments may consist of a singular object or a plurality of objects. In addition, among the aforementioned corresponding sub components, some sub components may be omitted, or other sub components may be further included in the various embodiments. Alternatively or additionally, some components (e.g., a module or a program) may be integrated as an object, and perform functions that were performed by each of the components before integration identically or in a similar manner. Further, operations performed by a module, a program, or other components according to the various embodiments may be executed sequentially, in parallel, repetitively, or heuristically. Or, at least some of the operations may be executed in a different order or omitted, or other operations may be added.

Also, while example embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims, and their equivalents. Further, it is intended that such modifications are not to be interpreted independently from the technical idea or prospect of the disclosure.

What is claimed is:

1. An electronic apparatus comprising:
a display;
a communication interface;
a memory storing at least one instruction; and
at least one processor operatively connected with the display, the communication interface, and the memory, wherein the at least one processor is configured to execute the at least one instruction to:
based on identifying that a second content is related to a first content and based on identifying a capture event, obtain a first image that captures a screen of an external apparatus providing the first content, and obtain a second image that captures a screen of the display providing the second content, the external apparatus being communicatively connected, through the communication interface, with the electronic apparatus,
obtain a third image comprising the first content and the second content based on the first image and the second image, and
store the third image in the memory,
wherein identifying that the second content is content related to the first content is based on the first content being provided through at least one of a same application, a same service, a same function, or a same server, as the second content.

2. The electronic apparatus of claim 1, wherein the capture event comprises at least one of an event wherein the screen of the display is captured, an event wherein a predetermined button is manipulated, or an event wherein a predetermined menu is selected, and
wherein the at least one processor is further configured to execute the at least one instruction to:
receive the first image from the external apparatus through the communication interface.

3. The electronic apparatus of claim 1, wherein the first content comprises one of a video content and a user content, wherein the second content comprises one of the video content and the user content that is different than the first content, and
wherein the user content comprises at least one of a chatting content, a writing content, a photographing content, a health content, or an environment content of a user.

4. The electronic apparatus of claim 1, wherein the at least one processor is further configured to execute the at least one instruction to:
obtain information on the first content; and
identify whether the second content is related to the first content based on the information on the first content.

5. The electronic apparatus of claim 1, wherein the at least one processor is further configured to execute the at least one instruction to:
based on identifying the capture event, obtain a fourth image that captures a screen of another external apparatus providing a third content;
obtain a fifth image comprising the first content, the second content, and the third content, based on the first image, the second image, and the fourth image; and
store the fifth image in the memory.

6. The electronic apparatus of claim 1, wherein the at least one processor is further configured to execute the at least one instruction to:
based on obtaining the third image, display the third image in at least a portion of the display;
provide, through the display, a list comprising a plurality of third images, the plurality of third images comprising a plurality of first contents and a plurality of second contents, the plurality of first contents being provided on the screen of the external apparatus and the plurality of second contents being provided on the screen of the display, the plurality of first contents and the plurality of second contents corresponding to a time range between a threshold time before and after a time when the capture event is identified; and
selecting the third image from among the plurality of third images.

7. The electronic apparatus of claim 1, wherein the at least one processor is further configured to execute the at least one instruction to:
based on obtaining the third image, display the third image in at least a portion of the display;
based on the third image being at least one of a live image or a video image, display the third image on an entire area of the display; and
based on the third image being selected, provide a replay function by reproducing the third image.

8. The electronic apparatus of claim 1, wherein the at least one processor is further configured to execute the at least one instruction to:
based on obtaining the third image, transmit, through the communication interface, the third image to the external apparatus.

9. The electronic apparatus of claim 1, wherein the at least one processor is further configured to execute the at least one instruction to:
obtain at least one of context information of the electronic apparatus or context information of the external apparatus corresponding to a time when the capture event is identified;
map the context information to the third image and store them in the memory; and
based on the third image being displayed on the display according to a user instruction, provide the context information on the display together with the third image.

10. The electronic apparatus of claim 1, wherein the capture event comprises an event wherein the screen of the external apparatus is photographed through a camera, and
wherein the at least one processor is further configured to execute the at least one instruction to:
obtain the first image by photographing the screen of the external apparatus.

11. The electronic apparatus of claim 1, wherein the at least one processor is further configured to execute the at least one instruction to:
provide information on the second content to the external apparatus; and
receive, from the external apparatus, information indicating whether the second content is related to the first content.

12. A method for obtaining a capture image of an electronic apparatus, comprising:
based on identifying that a second content is related to a first content and based on identifying a capture event, obtaining a first image that captures a screen of an external apparatus providing the first content, and obtaining a second image that captures a screen of the display providing the second content, the external apparatus being communicatively connected with the electronic apparatus through a communication interface of the electronic apparatus;

obtaining a third image comprising the first content and the second content based on the first image and the second image; and storing the third image, wherein identifying that the second content is related to the first content is based on the first content being provided through at least one of a same application, a same service, a same function, or a same server, as the second content.

13. The method of claim 12, wherein the capture event comprises:

at least one of an event wherein the screen of the electronic apparatus is captured, an event wherein a predetermined button is manipulated, or an event wherein a predetermined menu is selected, and the obtaining the first image comprises:

receiving the first image from the external apparatus.

14. The method of claim 12, wherein the first content comprises one of a video content and a user content, wherein the second content comprises one of the video content and the user content that is different than the first content, and wherein the user content comprises at least one of a chatting content, a writing content, a photographing content, a health content, or an environment content of a user.

15. The method of claim 12, wherein the capture event comprises an event wherein the screen of the external apparatus is photographed through a camera, and the obtaining the first image comprises obtaining the first image by photographing the screen of the external apparatus.

16. The method of claim 12, further comprising:

based on identifying the capture event, obtaining a fourth image that captures a screen of another external apparatus providing a third content;

obtaining a fifth image comprising the first content, the second content, and the third content, based on the first image, the second image, and the fourth image; and storing the fifth image.

17. The method of claim 12, further comprising:

based on obtaining the third image, displaying the third image in at least a portion of the display;

providing a list comprising a plurality of third images, the plurality of third images comprising a plurality of first contents and a plurality of second contents, the plurality of first contents being provided on the screen of the external apparatus and the plurality of second contents being provided on the screen of the display, the plurality of first contents and the plurality of second contents corresponding to a time range between a threshold time before and after a time when the capture event is identified; and selecting the third image from among the plurality of third images.

18. A non-transitory computer readable medium for storing computer readable program code or instructions which are executable by a processor to perform a method for obtaining a capture image of an electronic apparatus, the method comprising:

based on identifying that a second content is a content related to a first content and based on identifying a capture event, obtaining a first image that captures a screen of an external apparatus providing the first content, and obtaining a second image that captures a screen of the display providing the second content, the external apparatus being communicatively connected with the electronic apparatus through a communication interface of the electronic apparatus;

obtaining a third image comprising the first content and the second content based on the first image and the second image; and storing the third image, wherein the identifying that the second content is related to the first content is based on the first content being provided through at least one of a same application, a same service, a same function, or a same server, as the second content.

* * * * *